United States Patent [19]
Gaa

[11] Patent Number: 4,542,065
[45] Date of Patent: Sep. 17, 1985

[54] CHEMICALLY TREATED GLASS FIBERS AND STRANDS AND DISPERSED PRODUCTS THEREOF

[75] Inventor: Peter C. Gaa, Pittsburgh, Pa.

[73] Assignee: PPG Industries, Inc., Pittsburgh, Pa.

[21] Appl. No.: 612,536

[22] Filed: May 21, 1984

[51] Int. Cl.$^4$ .................. B32B 9/00; D02G 3/00; C08G 77/04

[52] U.S. Cl. .................. 428/391; 428/392; 428/375; 428/447; 524/588; 524/28; 524/26

[58] Field of Search ............... 428/391, 392, 425.5, 428/425.6, 428, 447, 288, 423.1; 65/3.43, 3.44; 524/588, 591; 528/26, 28

[56] References Cited

U.S. PATENT DOCUMENTS

| | | |
|---|---|---|
| 2,968,575 | 1/1961 | Mallonnee . |
| 3,479,310 | 11/1969 | Dieterich et al. . |
| 3,522,142 | 7/1970 | Wismer et al. . |
| 3,627,722 | 12/1971 | Seiter . |
| 3,632,557 | 1/1972 | Brode et al. . |
| 3,711,445 | 1/1973 | Chu et al. . |
| 3,870,684 | 3/1975 | Witt et al. . |
| 3,903,052 | 9/1975 | Wagner et al. . |
| 3,905,929 | 9/1975 | Noll . |
| 3,919,351 | 11/1975 | Chang et al. . |
| 3,920,598 | 11/1975 | Reiff et al. . |
| 3,935,146 | 1/1976 | Noll et al. . |
| 3,940,542 | 2/1976 | Knopf et al. . |
| 3,941,733 | 3/1976 | Chang . |
| 3,947,426 | 3/1976 | Lander . |
| 3,951,897 | 4/1976 | Matsuda et al. . |
| 3,979,344 | 9/1976 | Bryant et al. .......... 428/425 |
| 3,983,219 | 9/1976 | Chang .................. 428/447 |
| 4,031,120 | 6/1977 | Gervase . |
| 4,046,729 | 9/1977 | Scriven et al. . |
| 4,066,591 | 1/1978 | Scriven et al. . |
| 4,067,844 | 1/1978 | Barron et al. . |
| 4,092,286 | 5/1978 | Noll et al. . |
| 4,093,673 | 6/1978 | Chang et al. . |
| 4,146,585 | 3/1979 | Ward et al. . |
| 4,147,679 | 4/1979 | Scriven et al. . |
| 4,157,321 | 6/1979 | Kawakami et al. . |
| 4,190,566 | 2/1980 | Noll et al. . |
| 4,203,883 | 5/1980 | Hangauer, Jr. . |
| 4,222,925 | 9/1980 | Bryant et al. . |
| 4,237,264 | 12/1980 | Noll et al. . |
| 4,238,378 | 12/1980 | Markusch et al. . |
| 4,269,748 | 5/1981 | Nachtkamp et al. . |
| 4,271,229 | 6/1981 | Temple . |
| 4,292,226 | 9/1981 | Wenzel et al. . |
| 4,293,474 | 10/1981 | Dieterich et al. . |
| 4,293,679 | 10/1981 | Cogliano . |
| 4,303,774 | 12/1981 | Nachtkamp et al. . |
| 4,345,053 | 8/1982 | Rizk et al. .............. 524/440 |
| 4,374,237 | 2/1983 | Berger et al. . |
| 4,408,008 | 10/1983 | Markusch . |
| 4,413,086 | 11/1983 | Chang et al. . |
| 4,430,486 | 2/1984 | Chang et al. . |

FOREIGN PATENT DOCUMENTS 2167771 5/1972 France .
1143309 4/1967 United Kingdom .

OTHER PUBLICATIONS

Silane Coupling Agents, by Edwin P. Plueddemann, Plenum Press, New York.
Aqueous Emulsions, Dispersions and Solutions of Polyurethanes; Synthesis and Properties, by D. Dieterich, Progress in Organic Coatings, Elsevier.

Primary Examiner—George F. Lesmes
Assistant Examiner—Beverly K. Johnson
Attorney, Agent, or Firm—Kenneth J. Stachel

[57] ABSTRACT

Treated glass fibers having improved utilization of silane coupling agents are produced which have good strand handling and processing properties and which result in reinforced polymeric materials having good strength properties and good UV color stability. The treated glass fibers having an aqueous treating composition present on a substantial portion of the surface of the glass fibers, wherein the aqueous chemical treating composition has an aqueous dispersion of an internally silylated polyurethane polymer having siliconate anions and one or more dispersing agents in at least an effective dispersing amount, and water in an amount to give a total solids for the aqueous chemical composition for treatment of the glass fibers. The one or more dispersing agents, can be present as external dispersing agents in which case their amounts could be both an effective dispersing amount and an effective lubricating amount. In addition, the dispersing agents can be present with the internally silylated polyurethane polymer as an internal hydrophilic additive like nonionic and/or ionic and/or ionic precursor dispersing agents. In this case, the aqueous chemical treating composition has a glass fiber lubricant present in an effective lubricating amount. The internally silylated polyurethane may also have internal hardening segments to provide hardness to the polyurethane film formed on the glass fibers. The treated glass fibers can be used in reinforcing thermoplastic and thermosetting polymeric materials in various forms of continuous glass fibers and strand and chopped glass fibers and strands and mats of glass fibers and strands.

33 Claims, No Drawings

CHEMICALLY TREATED GLASS FIBERS AND STRANDS AND DISPERSED PRODUCTS THEREOF

The present invention is directed to chemically treated glass fibers and strands for use in reinforcing polymeric materials. More particularly, the present invention is directed to chemically treated glass fibers and strands having smaller amounts of chemical treatment present on the fibers, while providing good fiber and strand properties and good reinforcement properties in the polymeric matrix materials.

Glass fibers in various forms are used for reinforcing both thermosetting and thermoplastic polymeric materials. In producing glass fibers for such usage, the glass fibers must be chemically treated usually with an aqueous chemical treatment to make the glass fibers that have a hydrophilic surface more compatible with the polymeric materials and to protect the glass fibers from interfilament abrasion during manufacture and further processing. The aqueous chemical treatments are typically applied during formation of the glass fibers and usually include film forming materials; coupling agents; cationic, nonionic and/or anionic lubricants; cationic, nonionic, and/or anionic emulsifiers, processing aides and the like. The aqueous chemical treatment is applied to the glass fibers that are produced into forms such as continuous filaments, bundles of filaments, chopped filaments, chopped bundles of filaments, strands and chopped strands, bundles of strands or roving, twisted strands, braided strands and mats of filaments and/or bundles of filaments and/or strands.

One film forming polymeric material which has proved effective in the aqueous chemical treatment for glass fibers is the polyurethane polymer. The polyurethane polymer traditionally is utilized in the aqueous treating compositions in the form of an aqueous emulsion or latex. These have proven satisfactory in assisting in the production of treated glass fibers that have minimum breakage or unraveling of a bundle of fiber, when the latter is cut into short lengths for mixing with polymeric materials which would constitute the matrix of the reinforced polymeric material. In addition, the polyurethane film former has been used with a few other components in an aqueous treating composition without interfering to any great extent with the functions performed by these other components in the composition. In addition, polyurethane film formers have been found useful in aqueous treating compositions for glass fiber to enable the glass fibers to be supplied with color during the formation of the fibers. This color conferment is without the necessity of heat cleaning the chemical treating composition which is already present on the glass fibers and without subsequently applying a chemical treatment having a coloring agent. Also the polyurethane film formers provide the bundles or strands of treated glass fibers with good integrity and resistance to fuzzing during subsequent processing steps. Such subsequent processing steps might include the fabricating of strand or roving into forms suitable for use as resin reinforcement. The polyurethane film formers have been found particularly effective in producing glass fiber strand for the reinforcement of thermoplastic polymeric materials such as polyamides, nylon.

Glass fiber strand used to reinforce thermoplastic resins are subjected to high temperatures during mixing of the thermoplastic resin and/or during the forming and the shaping of the reinforced thermoplastic resin. These temperatures can be substantially higher than those encountered in making reinforced thermosetting resins such as reinforced polyester resins. At these high temperatures, discoloration of the thermoplastic resin sometimes occurs because of thermal instability of organic materials present in the chemical treatment on the glass fibers. Some polyurethane film forming resins have been reported to perform effectively as reinforcement for thermoplastics with reduced discoloration due to thermal instability. See U.S. Pat. Nos. 3,803,069 and 3,814,592 (McWilliams et al.). In addition to discoloration engendered from thermal chemical instability, ultraviolet radiation (UV radiation), generally having wavelengths below 290 nanometers, tends to engender discoloration of a fiber reinforced polymer. Over a period of time the UV light in both natural light and artificial light tends to cause discoloration and/or degradation by photo-oxidation of the organic components of the fiber reinforced polymers. Such organic components include the chemical treatment present on the glass fibers. This degradation of the organic materials in the chemical treatment possibly may contribute to the discoloration of the reinforced polymeric material. Discoloration from these sources leads to an unaesthetic appearance and a lack of color uniformity of the reinforced polymeric materials. It has been reported in U.S. Pat. No. 4,271,229 that aliphatic or cycloaliphatic polyurethane film formers in the presence of certain organosilanes perform effectively in chemical treatments for glass fibers without contributing any discoloration resulting from UV exposure.

Although polyurethane latices have been used effectively in treating glass fibers, the latices can be sensitive to the incorporation of some of the typical components of chemical treatments for glass fibers. For example, some of the components may actually break the latex. The use of these other components in the aqueous treating composition are necessary to provide other characteristics for the treated glass fibers and/or strands. For instance, the coupling agents or adhesion promoting agents in the composition provide for good adhesion or bonding of the glass fibers to the polymeric matrix. Also lubricants provide the requisite degree of lubricity for the processing of the glass fibers into strands for use in reinforcing polymeric materials. The use of additional components with the polyurethane film forming latex yields processable treated glass fiber strands which result in reinforced polymer materials having good strength properties such as dry and wet physical strengths like tensile strengths. An example of the components that are present in addition to the polyurethane film forming latex in an aqueous treating composition for glass fibers are those given in U.S. Pat. No. 4,271,229 (Temple). This sizing composition has the film forming polyurethane latex and in addition thereto a ureido functional silane and an amino functional silane and usually one or more compatible lubricants.

Unfortunately, the use of large amounts or multiple types of coupling agents, because of their relatively higher cost compared to that of the other components of a treating formulation, can adversely affect the economics of the treated glass fibers. The resultant cost of the fiber reinforced polymers is also affected because of the total amount of silanes formulated into a treating composition for glass fibers. In addition, the most efficient utilization of the coupling agents may not be achieved by current treating compositions having polyurethane latices that are used for glass fibers.

It is an object of the present invention to provide chemically treated glass fibers having a polyurethane film forming material which can be used with many other treating components without deleteriously affecting the polyurethane latex, which provides for a more efficient use of the coupling agent, and which allows for the use of smaller amounts of the chemical treatment on the glass fibers to achieve the desired strength properties of glass fiber reinforced polymer materials.

SUMMARY OF THE INVENTION

The aforementioned objects and other objects gleaned from the following disclosure by those skilled in the art can be accomplished with the chemically treated glass fibers of the present invention. The chemically treated glass fibers of the present invention have present a residue resulting from an aqueous chemical treatment having an aqueous dispersion of a polyurethane or poly(urethane-urea) polymer where the polymer has pendant silyl groups with siliconate anions and which has a hydrophilic nature along with one or more internal and/or external hydrophilic agents. The siliconate anions include: $-[SiO^-]$, $-[SiO_2=]$, and $-[SiO_3^{\equiv}]$. Hereinafter, both the polyurethane and poly(urethane-urea) polymers will be referred to as polyurethane polymer. In addition to the aqueous dispersion of silylated polyurethane polymer, the aqueous chemical treating composition also has one or more lubricants present in an effective lubricating amount.

The aqueous dispersion of internally silylated polyurethane polymer has the polymer which has been prepared in a one-shot or in a prepolymer, two-step process. The monomers for forming the polymer at least include polyester diol and/or polyol, di and/or polyisocyanate, and organosilane with at least one but usually at least a majority of two, isocyanate reactable groups. When the organosilane has two isocyanate reactable groups, the organosilane can be the chain extender in the prepolymer process in lieu of or in addition to its use as a comonomer. The polyurethane polymer also has a degree of hardness provided by the monomer already mentioned or by the inclusion of an additional monomer like a hardening segment diol or polyol. The aqueous dispersion is formed by dispersing the silylated polyurethane with internal dispersibility and/or with external dispersing agents in the aqueous dispersing medium. The dispersing medium is usually water, but it could include other components depending on the components of the polymer and or types of external dispersing agents. The pH of the dispersing medium or the dispersion is or should be adjusted to at least around 7, when the silyl concentration of the polymer is greater than about 0.1 weight percent of the water in the dispersion. The aqueous dispersion of the silylated polyurethane generally is used as the major component other than water in the aqueous chemical treating composition. With the silylated polyurethane polymer in the chemical treating residue on the glass fibers, the aqueous chemical treatment need not contain additional monomeric, hydrolyzable, organosilane coupling agents, although such coupling agents can be added, if desired.

The lubricants in the aqueous chemical treatment can be cationic, anionic, nonionic and/or amphoteric without causing stability problems with the dispersion of the polyurethane polymer. When external hydrophilic or dispersion additives are employed, one or more of these can act as the lubricant. In this case, the amount of the external hydrophilic additive is an effective dispersing and lubricating amount. Also, one or more lubricants optionally can be employed even when external hydrophilic additives are used. In this latter aspect, the external hydrophilic additive need only be used in an effective dispersing amount to disperse or to assist in dispersing the silylated polyurethane polymer in water. By internal hydrophilic additive, it is meant that the one or more hydrophilic additives are incorporated into the silylated polyurethane, where these additives increase the hydrophilicity of the polymer.

In the narrower aspect of the present invention, the glass fibers are treated with an aqueous chemical treating composition which is essentially free of monomeric organosilane coupling agents and which has an aqueous dispersion of a silylated polyurethane polymer having siliconate anions, where the polyurethane is internally dispersible by inclusion of one or more internal hydrophilic additives. The hydrophilic additive is selected from the ethylene oxide-containing materials and ionic or ionic precursor materials or mixtures thereof. In addition, the treating composition has the one or more anionic, cationic and/or nonionic lubricant.

In addition to the aqueous dispersion of the silylated polyurethane polymer, and lubricant and/or lubricating external hydrophilic additive, the aqueous chemical treating composition can have additional components such as wetting agents, processing aides, additional film formers, additional coupling agents and the like. The chemically treated glass fibers having the residue of the aqueous chemical treating composition can be in any form of glass fibers such as chopped glass fibers, continuous glass fibers, chopped glass fiber strand or bundles, continuous glass fiber strand or bundles, roving, woven products, continuous, chopped and/or needled mats and the like. The chemically treated glass fibers have at least a portion of their surfaces in contact with the residue of the aqueous chemical treatment. The residue can be a coating of the aqueous chemical treating composition still containing water which results from the mechanical application of the aqueous chemical treatment to the fibers. Also, the residue can be a coating produced by removing most or a substantial portion of the water usually by evaporation or drying or similar method from the aqueous chemical treatment present on the fibers. The chemically treated glass fibers with the residue of the aqueous chemical treating composition can be used to produce reinforced thermoplastic polymeric materials such as nylon, polybutylene terephthalate, polyethylene terephthalate, polystyrenics, thermosetting polymers such as polyesters for sheet molding compounds and bulk molding compounds and the like. These reinforced polymers have good stability against discoloration of the chemically treated glass fibers while having good mechanical, thermal and processing properties.

DETAILED DESCRIPTION OF THE INVENTION

The glass fibers having a residue of the aqueous chemical treating composition are provided with good polyurethane film properties and good stability against discoloration even with lower amounts of the residue on the glass fibers. The treated glass fibers can have a requisite degree of hardness from the polyurethane film properties to have good choppability. These various improvements in properties result from the residue of the aqueous chemical treating composition. The aqueous chemical treating composition effects such properties in the residue through its components and their interactions with each other and with the surface of the glass. For example, the aqueous dispersion of silylated polyurethane has good stability from silanol or siloxane formation. Additionally, the dispersion has good stability when augmented with additional components such as lubricants and/or external hydrophilic additives.

In the aqueous dispersion of the silylated polyurethane, the internally silylated, ungelled, polyurethane resin has pendant, silyl groups, a substantial number of which are siliconate anions. The silyl groups can be unhydrolyzed silanes or silanol groups or mixtures thereof which can be made reactable with the glass fiber surface through hydrogen bonding and/or van der Waals bonding and the like. The siliconate anions are reactable with the glass fibers through covalent bonding, ionic bonding, hydrogen bonding, and/or van der Waals bonding. Since the reactable silyl groups and siliconate anions are pendant from the organic moiety of the organosilane which is part of the polyurethane polymer backbone, the uniformity and proximity of the silicon bonding sites for association of the polymer to the glass fiber is improved. Although not intending to be bound by any theory in the foregoing, it is believed that the coating composition having the aqueous dipsersion of the ungelled polyurethane with pendant, silyl and/or siliconate anionic groups would have less random association of the polyurethane to the glass fiber since the location of the silyl and/or siliconate groups are on the polyurethane. Hence, this association between the polyurethane and the glass fiber may be less dependent on the random interaction of silane coupling agent with silane attracting areas on the surface of the glass fiber. This may lead to a more efficient interaction between the polyurethane and the glass fiber through silanol and/or siliconate anion interaction with hydroxyl groups of the glass fiber resulting in more efficient use of the organosilane coupling agent and polyurethane to achieve good coating performance. The lower or more efficient use is compared to usage, where the polyurethane and organosilanes are used independently in a type of treating formulation, which is a mechanical mixture. In addition, the aqueous dispersion of the ungelled, polyurethane resin with the pendant reactable silyl and/or siliconate anion groups has improved stability such as electrolytic stability so that other coating composition additives can be combined with the dispersion without adversely affecting the dispersion.

The silylated polyurethane polymers in the aqueous dispersion are ungelled or non-gelled. The use of the term "dispersion" is intended to include: emulsions, suspensions, colloids, and even forms or states near solutions at higher dilutions of the dispersion. By the term "ungelled" or "non-gelled", it is meant that branching and a small amount of cross-linking may be present in the dispersed resin, but the dispersed resin does not have present the degree of cross-linking necessary to result in a three dimensional polymeric network so as to form a nonsoluble, swellable material.

The terms "pendant" or "lateral", mean that the silyl groups and siliconate anion groups of an organosilane compound predominantly extend from the backbone chain of the polyurethane polymer. When the organosilane is difunctionally isocyanate reactable through two organic moieties having functionalities that are reactable in the isocyanate polyaddition reaction, the organic moiety or moieties or a portion of the organic moiety becomes incorporated into the backbone of the polyurethane polymer. In addition the terms "pendant and lateral" are meant to include terminal positioning which may occur to a minor extent. In the polymer when it is mentioned that the siliconate anions are present in a substantial number or amount it is meant that a majority of the silyl groups laterally present on the polymer have at least one and preferably two of the possible three or less free valences of the silicon atom occupied with oxygen and a cation. At least one of the other valencies of the silicon atom is occupied with the organic moiety which is incorporated into the backbone of the polymer. Any non-siliconate anion valencies are occupied by unreacted alkoxy, acyloxy or the like groups or hydroxy groups such as in silanol groups. The formula below shows the silyl group and the possible positions occupied as the siliconate anion.

where none or one of groups A, B or C can be an organic moiety and where one or more of the groups A, B or C are the anionic portion of the siliconate anion, [O³¹] and a cation, and where one or two of the groups A, B and C that are not the siliconate anion are selected from hydroxy, alkoxy, acyloxy or the like. The majority of silyl groups on the polyurethane polymer have at least one of the A, B or C groups as a siliconate anion and preferably the majority, around 50 percent or more, have around two of the A, B and C groups as siliconate anions. Of course, there may also be some silyl groups with all of the positions A, B and C occupied by the siliconate anions.

By the use of the term "precursor", it is meant to include as ionic groups those chemical groups which can be converted to ionic groups by chemical reactions such as by acid or basic reactions or neutralization reactions, where the precursor can be utilized in formation of the polymer with subsequent conversion to the ionic state.

The aqueous dispersion of the ungelled, silylated polyurethane resin with the pendant reactable silyl groups can be produced by the one step "one-shot" process, or the two step prepolymer process both of which are known generally to those skilled in the art. In both processes, the minimum number of reactants is three, and they include di and/or polyisocyanates, organic compounds with at least two active hydrogens, and organosilanes which are at least monofunctionally reactive with isocyanates. The organosilane can be used as a comonomer and/or, when it is difunctionally reactive with isocyanate, it can even be used as a chain extender in the prepolymer process. Present with these monomers can be hardening segments or the hardening segments can be incorporated by a separate monomer. Additional optional monomers for the polyurethane polymer formation include hydrophilic additives, and organo compounds with at least two active hydrogens having one or more hardening segments. The polyurethane polymer that is formed is not a homopolymer but a copolymer or terpolymer. Preferably, the silylated polyurethane is formed from an isocyanate-containing prepolymer which is dispersed in water and chain-extended. In forming the isocyanate-containing prepolymer, monomers that are reacted include diisocyanate and organic compounds with active hydrogens with or without the presence of an organosilane which is difunctional in reaction with isocyanates. When the organosilane is not present as a comonomer in the two step process, it is used to chain-extend the prepolymer. When the organosilane is present as a comonomer, the chain extender is any conventional polyurethane prepolymer chain-extender.

The polyisocyanate which is used to form the polyurethane polymer can be any conventional, art-recognized organic diisocyanate or polyisocyanate. The polyisocyanate may be aromatic, aliphatic, cycloaliphatic, or heterocyclic or mixtures thereof and may be unsubstituted or substituted with groups such as halogens, etc. The aliphatic and particularly the polyisocyanates are preferred, since it has been found that these provide better color stability in resulting coatings. Also, diisocyanates are preferred although higher polyisocyanates can be used in place of or in combination with the diisocyanates and even with small amounts of monoisocyanate. The average functionality of the reactants used in making the isocyanate-containing prepolymer is important in controlling the tendency of the polymer to gel. Where higher functionality polyisocyanates are used, some monofunctional isocyanates should be present to reduce the average functionality. Nonexclusive examples of the numerous art-recognized polyisocyanates that can be used in preparing polyurethane resins which may be used in the dispersion of the present invention, include diisocyanates or polyisocyanates which are based on the numerous monomeric organic isocyanates that contain carbodimide groups, allophanate groups, isocyanate groups, urethane groups, acrylated urea groups, biuret groups, ester groups, thioether groups and/or thioester groups and isocyanate-terminated adducts of diols or polyols such as ethylene glycol, 1,4-butylene glycol, polyalkylene glycol and the like, and thioisocyanate which correspond to known poly or diisocyanates that can be employed alone or in mixtures with N-isocyanate containing compounds, substituted organic polyisocyanates where the substituents are nitro, chloro, alkoxy and other groups which are not reactive with the hydroxyl groups or active hydrogens and provided the substituents are not positioned to render the isocyanate group unreactive. Additional nonexclusive art-recognized polyisocyanates that are used in preparing the silylated polyurethane polymer which may be used in the aqueous dispersion for treating glass fibers of the present invention, include those polyisocyanates enumerated in U.S. Pat. No. 4,413,086 (Chang et al.) and the higher polyisocyanates enumerated in U.S. Pat. No. 4,147,679 and U.S. Pat. No. 4,066,591 (Scriven et al.). The disclosures of all of these patents being hereby incorporated by reference. A particularly suitable diisocyanate used for preparing the isocyanate-containing prepolymer is the methylene-bis-(4-cyclohexylisocyanate) or 4,4'-methylene-bis-(cyclohexyl isocyanate). This particular polyisocyanate is commercially available from Mobay Chemical Company under the trade designation "Desmodur W" material.

In forming the silylated polyurethane polymer, any suitable organic compound containing active hydrogens known to those skilled in the art may be used for reaction with the organic polyisocyanates. The term "active hydrogen atoms" refers to hydrogens, which because of their position in the molecule display activity according to the Zerewitinoff test. Accordingly, active hydrogens include hydrogen atoms attached to oxygen, nitrogen or sulfur and thus useful compounds will include those having at least two of these groups in combination with groups such as hydroxyl (—OH), amines (—NH or —NH$_2$) and thio (—SH). The moieties attached to each group can be aliphatic, aromatic, cycloaliphatic or of a mixed type not including carbonyl, phosphonyl or sulfonyl linkages. Nonexclusive examples of such compounds include amines like polyamines, aminoalcohols, mercapto-terminated derivatives and alcohols which include polyhydroxy materials (polyols and polyester polyols). Further examples of these materials are given in U.S. Pat. Nos. 3,169,949; 3,832,333; 3,919,351; 4,147,679 and 4,066,591 which are incorporated herein by reference. A particularly suitable organic compound useful in the present invention is the polyester diol which is polycaprolactone diol available under the trade designation "Tone-200" from Union Carbide Corporation, which is a reaction product of diethylene glycol and epsilon-caprolactone.

The amounts of the polyisocyanate and organic compound with at least two active hydrogens employed in preparing the polyurethane polymer are those amounts conventionally used in a one-shot or prepolymer preparation process. Therefore, these compounds can have a stoichiometric ratio or the polyisocyanate can be used in an excess amount usually ranging up to around 3 to 1 or for the one-shot process, the ratio can have a slight excess of the organic compound with active hydrogens.

In preparing the internally silylated polyurethane, silylation is introduced through an organosilane which is at least monofunctionally but preferably difunctionally reactive with isocyanates, and which is used as a comonomer or as a chain extender during the formation of the polymer. The organosilane would have the formula

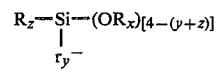

where $r_y$ and $R_z$ are the organic moieties having 1 to 20 carbon atoms such as alkyls having 1 to 6 carbon atoms and aryls, alkyl aryls and aryl alkyls where y and z are integers so that y is equal to 0 or 1 and z is equal to 1 or 2, where one or both of the $r_y$ and $R_z$ have at least one and/or two and/or more isocyanate-reactable groups when y=0 or when the $r_y$ organic moiety has no such reactable groups, and where $(OR_x)$ is the hydrolyzable or hydrolyzed groups such as alkoxyl, acyloxy, hydroxy and the like and $R_x$ can be methyl, ethyl, n-propyl, hydrogen or the like. The $R_z$ group preferably is selected from organic moieties having 3 to 10 saturated carbon atoms such as alkyls, divalent alkyls, a divalent polyalkylene or polyoxyalkylene having not more than 1 ether oxygen per 2 carbon atoms and divalent alkyls and organic moieties that are at least monovalent and/or divalent and/or polyvalent in having at least one and/or two and/or more functional groups selected from hydroxyl (OH), mercapto (SH), ureido (NH—C-(O)—NH), primary or secondary amines (NH$_2$, NHR) and tertiary amine (N[C$_2$H$_4$OH]$_2$). These functionalities are nonexclusive examples of isocyanate-reactable groups. As with the other reactants for the polymer, when functionalities of more than two exist for the isocyanate reactive group, some monofunctional isocyanate reactive groups should be present to deter gelation. It is preferred that the $R_z$ moiety has $Z=1$ and R is a saturated moiety with two isocyanate-reactable groups, and it is preferred that in $r_y$, $Y=0$. In the aforedescribed formula for the organosilane, the silyl group is represented by the moiety $R_z$—$[Si^{3+,3-}]$ showing that the silyl groups can have three other bonds. Nonexclusive examples of monofunctional isocyanate-reactable organosilanes include: aminoethyltriethoxysilane, gamma aminopropyltriethoxysilane, gamma-aminopropyltrimethoxysilane, gamma aminopropylethyldiethoxysilane, gamma-aminopropylphenyldiethoxysilane, gamma-aminopropyltrimethoxysilane, deltaaminobutyltriethoxysilane, deltaaminobutylethyldiethoxysilane. Preferred monofunctional amino silanes are the gamma-aminopropyltrimethoxysilane. Nonexclusive examples of the difunctional, isocyanate reactable alkoxy silanes include: N-beta(amino propyl)-gamma-aminopropyltrimethoxy silane, N-(dimethoxy methyl silyl isobutyl)ethylene diamine. A particularly suitable organosilane which is difunctional in the isocyanate polyaddition reaction is the N-beta-(amino ethyl) gamma aminopropyltrimethoxy silane which is available under the trade designation A-1120 from Union Carbide Corporation and under the trade designation Z-6020 from Dow Corning Chemical Corporation. In addition to the monofunctional and/or difunctional isocyanate reactive organosilane, a trifunctional isocyanate reactive organosilane can be used. A nonexclusive example of such an organosilane is N-beta(ethylenediamino)ethylgamma aminopropyltriethoxy silane available from Union Carbide Corporation as A-1130 triamino silane. In using the mono, di or trifunctional organosilanes as a mixture of one or more of them, it is preferred that the amounts of the mono and trifunctional silanes not exceed. The amount of the difunction isocyanate reactable organosilane. In this way, the difunctional form is always the predominant form whenever the isocyanate-reactive functionality of the organosilane is greater than two, its use should be limited in such a manner to discourage the formation of a highly branched and/or crosslinked polyurethane polymer so that a three-dimensional polymeric network is formed. It is preferred when using the organosilane to limit the presence of any dimer or trimer forms of silanol or siloxane. It is most preferred to have difunctional, isocyanate-reactable organosilane that is around 100 percent monomeric silane including any suitable solvent such as the A-1122 silane available from Union Carbide Corporation. The amount of the organosilane which can be used is in the range of about 0.05 to greater than 0.6 weight percent of the total urethane formulation. An advantage of the present invention is to allow for the presence of higher concentrations of silyl groups associated with the polyurethane polymer, therefore, it is preferred to use amounts of organosilane in excess of 0.6 weight percent. The only upper limit on the amount of organosilane used is that amount which would cause three-dimensional gelation through interactions of the non-siliconate anion groups such as silanols to form siloxanes.

In addition to the polyisocyanate, organic compound with at least two active hydrogen atoms, and isocyanate-reactable organosilane, the silylated polyurethane polymer, prepolymer or chain-extended prepolymer can be formed with one or more hydrophilic additives. Hydrophilic additives such as non-ionic solubilizing groups and/or ionic and and/or ionic precursor groups can be incoporated into the polymer. The hydrophilic agents can be incorporated into the the polymer structure either in the backbone of the polymer or pendant from the polymer backbone to remain in the polymer even when the coating has been applied so that hydrophilicity is introduced into the coating. The degree of hydrophilicity introduced into the coating should not be too great since larger degrees of hydrophilicity will adversely affect the film forming properties of the polyurethane resin. The hydrophilic additives generally can be selected from art-recognized non-ionic, ionic and ionic precursor type solubilizing groups. The types of hydrophilic additives disclosed in U.S. Pat. Nos. 4,066,591 and 4,147,679 already incorporated herein by reference, are examples of hydrophilic additives that can be used. Nonexclusive examples of the nonionic type hydrophilic additives include: poly(ethylene oxide) homopolymer, ethylene oxide moieties incorporated into the polymer from the isocyanate or through the active hydrogen compound of the prepolymer, and monofunctional polyethers, polyether polyols and polyethers containing a substantial amount of ethylene oxide units or organic compounds which are difunctional in the isocyanate polyaddition reaction and contain lateral, hydrophilic ethylene oxide units, monoisocyanates which contain terminal, hydrophilic ethylene oxide units and organic compounds which are monofunctional in the isocyanate polyaddition reaction and contain terminal, hydrophilic ethylene oxide units and mixtures of these hydrophilic additives. Whenever the hydrophilic additive is to be incorporated into the backbone of the polyurethane resin, it is preferred that the hydrophilic additive be a poly(oxyethylene) homopolymer which is added as a comonomer in the formation of the polyurethane polymer or prepolymer. When the hydrophilic additive is lateral and/or terminal in the polyurethane resin, then the hydrophilic additive can be the monomeric, alkylene epoxide materials having an ethylene oxide content of about 15 to 100 mole percent of the monomeric alkylene oxide. Other alkylene oxides which can be present when the amount of ethylene oxide is less than 100 mole percent include polymers or copolymers of styrene oxide, propylene oxide, tetrahydrofuran, butylene oxide, or epihalohydrin.

These nonionic hydrophilic additives may be prepared by any method known to those skilled in the art. It is even possible to incorporate the nonionic, hydrophilic additive into another monomer for the isocyanate polyaddition reaction. For instance, the isocyanate having hydrophilic agents such as the ethylene oxide moieties which would be used in a mixture with polyisocyanate not having ethylene oxide units can be prepared to have from about 5 to about 100 mole percent of a diisocyanate of polyethylene oxide units. Such a modified allophanate diisocyanate can be prepared by heating one mole of a monofunctional ethylene oxide containing alcohol with two moles of the diisocyanate having a general formula of $R(NCO)_2$. The first stage of the reaction yields the urethane which then reacts with a second mole of diisocyanate at a higher temperature to give rise to the allophanate diisocyanate. Other nonionic, hydrophilic additives like monomer alcohols containing polyethylene oxide units such as those represented by the formula $HO(CH_2CH_2O) \times CH_2CH_2—Y—R$ can be prepared by alkoxylation of secondary amines where $Y=0$ or N for nitrogen and, where the R is a hydrocarbon group, in particular, $C_1$ to $C_{10}$ alkyl groups, $C_4$ to $C_8$ groups, $C_6$ to $C_{12}$ aryl groups or $C_7$ to $C_{10}$ arylalkyl groups, and where any suitable alcohol or phenol may be used such as for example, methanol, ethanol, n-propanol, n-hexanol, p-cresol, benzyl alcohol or the like, and where any suitable secondary amine may be used such as, for example, dimethyl amine, diethyl amine, dipropylamine and the like. The quantity of ethylene oxide grafted into the monomeric ethylene oxide-containing alcohol or phenol generally has about 5 to about 90 mole percent of the ethylene oxide moiety. This hydrophilic agent can then be used as a comonomer in the reaction with polyisocyanate and a difunctional organic compound having active hydrogen. This hydrophilic agent is usually used in an amount of not more than 50 percent of the weight of the polymer and preferably in an amount of less than about 10 percent by weight based on the weight of the polymer.

The internal emulsifiers which are of the ionic type or precursors of the ionic type include cationic, anionic or both or precursor compounds that through neutralization or other like chemical reactions can be converted to ionic groups such as cationic, anionic, amphoteric and zwitterionic. Any ionic material or precursor of the ionic material known to those skilled in the art for the internal emulsification of polyurethane resins can be used. Nonexclusive examples of such compounds are given in U.S. Pat. Nos. 4,147,679 and 4,066,591 which have already been incorporated herein by reference. A particularly useful precursor of an ionic material is the dimethylolpropionic acid.

It is preferred to have the hydrophilic additive present to make the polymer internally dispersible. This type of polymer can be used to prepare an aqueous dispersion of silylated polyurethane that is essentially emulsifier free. By the term "essentially emulsifier free" it is meant that the polyurethane dispersion usually needs no externally added emulsifiers or detergents to maintain its stability, although emulsifiers which are externally added may be used if desired. The polyurethane resin dispersions of the present invention are very stable in that once the resins are dispersed, they ordinarily will not settle or flocculate.

It is preferred in preparing a polyurethane polymer with internal silylation, where the polymer should have good film forming properties that the hydrophilic additive is one having ionic groups or precursor ionic groups. In using mixtures of the ethylene oxide-containing material and ionic or precursor ionic materials, the materials may be added to form the polymer or prepolymer in a sequential or simultaneous manner with each other and other components to form the polymer or prepolymer. The only exception is where the ionic or precursor ionic material would interfere with the reaction of the organosilane and polyisocyanate. In this situation, the ionic or precursor ionic material should be added subsequent to near complete reaction of the organosilane and polyisocyanate. When the hydrophilic additive utilizes an ethylene oxide-containing moiety, it is preferred to use a poly(oxyethylene) homopolymer. It is most preferred that the molecular weight of the polyoxyethylene homopolymer is in the range of greater than 1,000 up to about 4,000 in order to obtain a polyurethane resin which is a good film former having good tensile strength. In addition, the polyoxyethylene homopolymer provides good electrolytic stability of the resulting aqueous dispersion of the silylated polyurethane resin for the addition of acidic or basic components to the dispersion.

In the polymer or prepolymer, the amount of the hydrophilic additive which is an ethylene oxide-containing material should not exceed about 10 weight percent of the polymer or prepolymer. Amounts of such hydrophilic additives in excess of 10 weight percent could be used and would improve the dispersion of the polyurethane resin, but the resulting polyurethane resin used on substrates as a coating would have a reduced tensile strength and an increased elongation. When the hydrophilic additive is an ionic or precursor ionic material, the amount generally should not exceed about 50 weight percent. The ionic or precursor ionic material can replace all of the organic compound with at least 2 active hydrogens in formation of the polymer. The amount of the hydrophilic additive used in obtaining the polymer should be at least about 3 weight percent of the isocyanate reactive monomers when the di or polyisocyanate material that is used has a hydrophilicity equivalent to methylene-bis (4-cyclohexyl isocyanate). When the di or polyisocyanate is a more hydrophilic material than the methylene-bis-(4-cyclohexyl isocyanate) a lesser amount of hydrophilic additive can be used, and conversely, when the di or polyisocyanate is more hydrophobic that the methylene-bis-(4-cyclohexyl isocyanate) larger amounts of hydrophilic additive can be used. In using a mixture of the hydrophilic additives, such as the ethylene oxide-containing material and the ionic or precursor ionic materials, it is preferred to have a majority of the hydrophilic additive as the ionic or precursor ionic material and a minority of the hydrophilic additive as the ethylene oxide-containing material to improve the final properties of the silylated polyurethane resin. As is known in the art, the emulsifying power of the ethylene oxide-containing material and the ionic material are not equivalent, and it would take less ionic material to disperse a polyurethane resin than the amount of the ethylene oxide-containing material for an equivalent polyurethane resin. Therefore, if the ethylene oxide-containing material is used alone as the hydrophilic additive, a slightly larger amount of this material than the 3 weight percent may be needed for a polyurethane having an equivalent hydrophilicity to the polyurethane obtained from methylene-bis-(4-cyclohexyl isocyanate).

The percentage of the ionic groups in the polymer can be expressed as the salt group equivalent weight. This is defined as the weight per salt group, and it can be determined by dividing the weight of the resulting polymer or prepolymer in grams by the number of salt groups present in the polymer or prepolymer. The salt group equivalent weight of the polymer or prepolymer should broadly be about 6,000 or less, preferably from about 200 to about 500 in order to obtain stable aqueous dispersions. The importance of the salt group equivalent weight and counter ion concentration in avoiding gelation is described in U.S. Pat. Nos. 4,066,591 and 4,066,679, already incorporated by reference.

Additional optional material that may be used in forming the one-shot polymer or isocyanate-containing prepolymer are low molecular weight, active hydrogen-containing compounds such as polyols to add a degree of hardness to the resulting polyurethane film. It is especially preferred to add these polyols as comonomers in forming the one-shot polymer or isocyanate-containing prepolymer. It is most preferred to use these polyols as comonomers in forming the prepolymer, when the resultant polyurethane resin is to perform with better film forming properties on the treated glass fibers. In general, the low molecular weight, active hydrogen-containing compound will be present in an amount up to about 50% by weight of the prepolymer, preferably about 2 to about 35 weight percent by weight based on total weight of the one-shot polymer or prepolymer reactants. When the low molecular weight, active hydrogen-containing compound is needed for water solubility, such as is the case with prepolymers containing non-ionic water solubilizing groups, higher percentages of the low molecular weight, active hydrogen-containing compounds should be employed. For example, amounts ranging from about 2 to about 35 percent based on the total weight of the one-shot polymer or prepolymer reactants can be used. A particularly suitable hardening active hydrogen-containing polyol useful in the present invention for incorporating hard segments is butane diol, and especially 1,4-butane diol. Any active hydrogen-containing compound with a low molecular weight which will function to harden the polyurethane film forming polymer on the surface of the glass fibers can be used.

The polyurethane polymer or prepolymer or chain extended polymer having internal silylation with or without internal emulsification can be prepared by the techniques of one-shot or prepolymer procedures known to those skilled in the art, where the organosilane which is at least monofunctional and preferably difunctional in the isocyanate-polyaddition reaction is used as a comonomer and/or as a chain extender. For example, the reaction to form the single shot polymer or prepolymer is essentially anhydrous to retard any reaction of the isocyanate groups with water. Also, the reaction may be conducted in the melt phase or in the presence of a solvent. The solvent is employed to facilitate reaction and control the viscosity. The viscosity of such a polymer or of the prepolymer is important in obtaining a stable aqueous dispersion with a finely particulated disperse phase. The viscosity of the polymer or prepolymer can be reduced by heating the neat polymer melt or by dissolving the polymer in a suitable solvent. Dissolution of the polymer or isocyanate-containing prepolymer in an organic solvent is preferred, because it is an easier way to control polymer viscosity. Suitable solvents are those which are unreactive toward the isocyanate groups. Such solvents are organic solvents such as ketone, tertiary alcohols, ethers, esters, amides, hydrocarbons, chlorohydrocarbons, and chlorocarbons. Suitable solvents for the polymer product to be dispersed in water, which are reactive toward isocyanate groups, can be added right before the polymer or prepolymer is dispersed in the water, during dispersion or after dispersion. Solvents for the final polymer product should be water-soluble, if they are added after dispersion and examples include ketones and alcohol.

The polymer and prepolymer reaction can be conducted in the presence of a catalyst known to accelerate the reaction between isocyanate groups and organic compounds with active hydrogens. Nonexclusive examples of such catalyst include organo tin compounds, like dibutyl tin dilaurate, stannous octoate, and tertiary amines. Generally, the use of a catalyst is not necessary and for specific uses it may be preferred to conduct the reaction without a catalyst. The reaction can take from several minutes to several days depending on the reactivity of the reactants, temperature, presence or absence of catalysts and the like.

The polyurethane polymer or isocyanate-containing prepolymer is prepared from the polyisocyanate, the organic compound with active hydrogens, the isocyanate-reactive organosilane, with or without the presence of hydrophilic additive, where these materials are all comonomers. When the hydrophilic additive is used and it is an ethylene oxide-containing compound for lateral attachment to the polymer backbone or the hydrophilic additive is an ionic compound, the order of addition of the reactants will be different. The polyisocyanate is reacted with the organic compound having active hydrogens and, if used, the hydrophilic additive like the poly(oxyethylene) glycol, and organosilane by charging all of the monomers to a suitable reaction vessel simultaneously or sequentially. For example, the polyisocyanate is usually first charged to any suitable reaction vessel known in the art followed by the addition of the organosilane. Subsequently or simultaneously, the active hydrogen containing compound is added. Subsequently or simultaneously, if the polyoxyethylene glycol homopolymer is used, it is added. The mixture may be heated, if necessary, with agitation until the isocyanate has completely reacted with the organosilanes and the hydrogens and, if used, the hydrophilic additive to produce the polyurethane polymer or NCO-containing prepolymer. The polymer or prepolymer would have essentially constant NCO equivalent, when the reaction is terminated.

The polyurethane polymer or isocyanate-containing prepolymer is preferably linear to the highest degree possible, which is accomplished by preferably using at least an equivalent ratio of isocyanate groups to isocyanate-reactive groups. These latter materials include the organic compound with active hydrogen groups, the organosilane and any hydrophilic additive to obtain the polyurethane polymer. To obtain the isocyanate-containing polymer an excess of di or polyisocyanate may be used. Generally, the ratio of isocyanate groups to isocyanate-reactive groups is maintained in an excess amount of between about greater than 1:1 to about 3:1. With the simultaneous addition of the reactants, the polymer or prepolymer will be a random copolymer. When the reactants are added in a sequential addition, the reaction will lead to the production of block copolymers. It is preferred to produce the random copolymer. The polyurethane one-shot polymer or chain extended prepolymer is at least a copolymer having at least two types of repeating units from the monomers, polyisocyanate, and organo compound with at least 2 hydrogens, and hydrophilic additive, if used, and from the organosilane comonomer or chain extender.

The reaction temperature during one-shot polymer or prepolymer formation must be at a temperature less than around 200° C. at atmospheric pressure or any equivalent temperature at a different pressure to minimize the occurrence of certain side reactions. These side reactions include transesterification or transalkoxylation reactions between the organosilanes and the organic compounds with active hydrogens such as polyols or the poly(oxyethylene) glycol homopolymer and reactions that result in the formation of appreciable amounts of allophanates and biurets. The reaction is continued until an essentially constant NCO equivalent is obtained, but the one-shot polyurethane polymer or isocyanate-containing prepolymer can have a free isocyanate content of about 1 to about 8 percent based on the weight of the polymer or prepolymer. Generally, the molecular weight of the one-shot polymer is around 25,000, while that of the prepolymer is less than about 25,000 and preferably is in the range of about 500 to 5,000. The molecular weights can be in either number average or weight average measurements or any other molecular weight measurement known for polymeric materials. Preferably, the reaction temperature is in the range of about −20° to 130° C., and most preferably from about 60° to about 90° C. In preparing the isocyanate-containing prepolymer reaction as opposed to the one-shot polymer reaction, the anhydrous environment of the reaction can be modified by first reacting the organosilane material with the isocyanate to end-cap the isocyanate groups. Then the end-capped isocyanate groups can be reacted with the organic compound having active hydrogens and the hydrophilic additive that contains ethylene oxide moieties in an environment that is somewhat less than anhydrous, although not too much water should be present.

The order of addition of the reactants to form the polymer is important when the reactants are polyisocyanate, organic compounds with active hydrogens, and organosilane used as a comonomers and a hydrophilic additive which has or is an ionic or precursor group. An ionic or precursor ionic hydrophilic additive is capable of reacting with some of the reactants or a monofunctional ethylene oxide-containing organic compound or a mixture of these materials with any other hydrophilic additive in a manner to interfere with other polymeric reactants of these materials. When the hydrophilic additive includes or is an ionic hydrophilic additive such as the anionic hydrophilic additive with carboxylic groups, the isocyanate-reactable organosilane should be nearly completely reacted with the polyisocyanate before the addition of the ionic hydrophilic additive to the polymeric or isocyanate-containing prepolymer reaction. Another approach to avoid such interfering reactions is to neutralize any precursor ionic hydrophilic additive before dispersing the one-shot polymer or isocyanate-containing prepolymer in water. Alternatively, the order of addition to avoid interfering reactions could be to neutralize any ionic or precursor ionic hydrophilic additive and add the organosilane and subsequently add the polyisocyanate. In this approach, the organic compound with at least 2 active hydrogens could be added at any time. Also, when monofunctional hydrophilic agents are added to the polymeric or isocyanate-prepolymeric reactions, these materials should be added after the reaction of the comonomers of the polyisocyanate, organic compound with active hydrogens, and organosilanes have progressed for some period of time.

The average functionality of the reactants used in preparing the one-shot polymeric and isocyanate-containing prepolymer is important in controlling the tendency of the polymer to gel. Where active hydrogen-containing materials and polyisocyanates with higher functionalities such as trifunctional and higher functional materials are used, the use of some monofunctional active hydrogen-containing materials and isocyanates is preferred. It is most preferred to use the reactants which are exclusively difunctional in order to obtain a high degree of linearity in the silylated polyurethane polymers. As is known to those skilled in the art of chemistry of polymeric polyurethane latices, the addition of small quantities of trifunctional, low-molecular weight material can improve the properties of the resulting polymer. For these purposes, the amount of such trifunctional material that could be added should be limited to less than around one equivalent percent based on the weight of the one-shot polymer or isocyanate prepolymer. The prepolymer from the completion of the first stage of the two stage process, and the one-shot polyurethane polymer are ready for dispersion in water after reaction of the comonomers to the desired NCO equivalent. For other general conditions of forming a polyurethane polymer by the two stage prepolymer process, the disclosures of U.S. Pat. Nos. 4,147,679 and 4,066,591 are hereby incorporated by reference. If required, the prepolymer and the one-shot polyurethane polymer can be neutralized before or during the formation of the dispersion in a similar manner to the neutralization procedure used for prepolymers as discussed with reference to counterions in U.S. Pat. Nos. 4,147,679 and 4,066,591. Also the neutralization can be performed by any method known to those skilled in the art.

Dispersing the sundry types of polyurethanes to be used in the aqueous chemical treating composition for treating glass fibers depends on several factors. One factor is whether the polyurethanes have internal hydrophilic additives and, if so, what type of internal hydrophilic additive. Another factor is whether the isocyanate-reactable organosilane is already present on the polyurethane polymer or isocyanate-containing prepolymer or is to be incorporated into the prepolymer by chain extension.

When one or more hydrophilic additives are not incorporated into the polyurethane polymer or prepolymer or chain extended prepolymer having internal silylation, the polymer or prepolymer is dispersed in water with the aid of external emulsifiers. Even when the hydrophilic additives are incorporated into the polymer, external emulsifiers optionally can be used. The external emulsifiers that can be used are one or more art-recognized dispersants or emulsifiers which alone or in combination give an effective emulsification matching of the hydrophilic-lipophilic balance (HLB) for dispersibility to the HLB or HLB character of the polyurethane polymer or prepolymer. Such a procedure is known in the art as shown in the article entitled "Calculations of HLB Values of Non Ionic Surfactants", William C. Green, The American Perfumer & Essential Oil Review, May, 1955, which is incorporated herein by reference. Generally, any nonionic, cationic, anionic, amphoteric or zwitterionic dispersant or emulsifier can be used which has the effective HLB value in an effective amount at least to disperse the polyurethane polymer or isocyanate-containing prepolymer in water. In addition, the amount of the external dispersant and/or emulsifier may be not only an effective dispersing amount, but also an effective lubricating amount in producing the aqueous chemical treating composition for glass fibers. This amount can be as high as twenty (20) percent of the solid resin. In addition the amount of the external dispersant and/or emulsifier may be not only an effective dispersing amount, but also an effective lubricating amount in producing the aqueous chemical treating composition for glass fibers. To form an oil-in-water dispersion of the polyurethane polymer or prepolymer with external emulsifiers, strong shear forces may be necessary if these materials have higher viscosities. Small amounts of water-insoluble organic solvents may be used with the external emulsifiers to ease the dispersion of the polyurethane polymer or prepolymer. The one or more external dispersants can be added prior, simultaneously, or sequentially with the polymer or prepolymer in addition to water. In adding these materials to water, the dispersion is prepared in the same manner as for the polymers and prepolymers having hydrophilic additives as is more fully discussed infra.

The one-shot polyurethane polymer or isocyanate-containing prepolymer having hydrophilic additives can be dispersed in water in a number of ways. The polymer or prepolymer, whether neat or a solution, preferably is added incrementally to most or a substantial portion of the aqueous dispersing medium with agitation. Alternatively, the aqueous dispersing medium can be added incrementally to the polymer or prepolymer with stirring. However, this latter method is less preferred because commonly upon initial addition of the dispersing medium, a high viscosity, grease-like material results. The main disadvantage associated with the grease-like viscosity is that it is very hard to stir in more water. In the absence of efficient stirring, the possibility increases of forming an unstable emulsion system because of large particle size agglomerates. By adding the polymer or prepolymer to water, this high initial viscosity is avoided. As noted in U.S. Pat. Nos. 4,147,679 and 4,066,591, additional solvent can be added to the isocyanate-containing prepolymer or even to the one-shot polymer before or after addition of the polymer or prepolymer, where the solvent is added to the aqueous medium. In referring to the aqueous dispersing medium, it is intended to include water plus water having solvent and possibly neutralizing agents. If the water is added to the polymer or prepolymer, any method known to those skilled in the art in producing polyurethane aqueous dispersions can be used to reduce the possibility of increasing the formation of large particle size agglomerates.

Chain extension of the isocyanate-containing prepolymer that is dispersed in the aqueous dispersing medium can be conducted to increase the molecular weight of the isocyanate-containing prepolymer. The chain extender can be added to the aqueous dispersion or can be present in the aqueous dispersing medium, when the isocyanate-containing prepolymer is dispersed. When the chain extender is added to the aqueous emulsion of the isocyanate-containing prepolymers, it is added fairly quickly. Any of the chain extenders and generally any methods for chain extending isocyanate-containing prepolymers known to those skilled in the art of forming aqueous polyurethane dispersions by the two step prepolymer process, can be used. Examples of the chain extenders and the method for chain extension are given in U.S. Pat. Nos. 4,147,679 and 4,066,591, both of which have been incorporated by reference. A suitable chain-extender for use in the present invention is diethylene triamine. As an acceptable variant, the chain extenders which introduce additional hydrophilic characters to the polyurethane polymer can also be used. For example, if the hydrophilic agent used as the comonomer in producing the polyurethane resin is solely the ethylene oxide-containing compound, additional ionic compounds can be added for additional hydrophilicity of the polymer by using chain-extenders having ionic groups which have been neutralized. Also if the hydrophilic agent used as the comonomer in forming the prepolymer is solely the ionic group containing material, then ethylene oxide units can be added through the chain-extender which has ethylene units in addition to being polyfunctional for reaction with isocyanate groups. The traditional chain extension method must be modified to reflect the presence of the silylated prepolymer. Chain extension is ordinarily conducted with the aqueous dispersed polyurethanes. When the silyl concentration of the silylated polyurethane is greater than about 0.1 weight percent, the pH is maintained at least around 7. It is preferred to add the chain extender in increments to the dispersed prepolymer with agitation and immediately thereafter add a requisite amount of pH modifier to achieve a pH of at least around 7.

In addition to the known chain-extenders being used for chain-extending the isocyanate-containing prepolymer having the organosilane incorporated therein, the prepolymer can be chain extended by the isocyanate reactive organosilane which has preferably difunctional isocyanate reactivity. In this alternative embodiment of the present invention, the isocyanate-containing prepolymer is prepared with the polyisocyanate and the organic compound with active hydrogens with or without but preferably with hydrophilic additives. This prepolymer may also have any of the other additional comonomers as aforementioned and may be neutralized, if need be, because of the presence of the precursor ionic hydrophilic additive. This isocyanate-containing prepolymer is then dispersed in an aqueous medium similar to that described above for the isocyanate-containing prepolymer having the pendant silyl groups. When the difunctional isocyanate reactive organosilane is used as the chain-extender, the method of using it as a chain-extender is similar to using other chain extenders except that the upper limit of the amount of the silane, which can be used to chain extend the prepolymer, is about 10 weight percent of the prepolymer. Amounts greater than this amount may result in gellation. Also in using the organosilane as the chain extender, the prepolymer if containing any precursor ionic hydrophilic additive, must be nearly completely neutralized to avoid unfavorable side reactions. Equally for similar reasons, the temperature must be controlled. These steps are necessary so that the transesterification and transalkoxylation reactions between the silanes and the hydroxyl groups on the isocyanate-containing prepolymer do not occur to any great extent and so that appreciable amounts of allophanates and biurets are not formed.

Whether a chain extension is accomplished with chain-extenders commonly used in preparing latices of polyurethane resins or with the difunctional isocyanate reactive organosilanes, as was the case for neutralization, the pH of the aqueous dispersion must be controlled to deter the formation of silane or silanol dimers and siloxane oligomers. This is accomplished by having a pH that approaches alkalinity so that the formation of siliconate anions is the preferred reaction over the reaction of silanol groups to form dimers and siloxane oligomers. Generally, when the silyl concentration on the polymer is greater than around 0.1 weight percent of the water in the aqueous dispersion, the pH for the dispersion is of at least around 7. If the pH is not already at this value from the types of materials in the dispersion, a pH modifier is added in an effective amount to give a pH for the dispersion of at least around 7. At this pH, a substantial number of the silyl groups on the polymer are converted to siliconate anions. With a larger concentration of silyl groups on the polymer, an increased pH may be required. For instance, at silyl concentrations greater than 0.4 weight percent of the water in the aqueous dispersion, the pH should be or should be adjusted to about 8.5 or greater. At this pH, a substantial number of the silyl groups present in the increased concentration of the silyl groups are converted to siliconate anions. The result is a more stable silylated polyurethane polymer latex.

In preparing the aqueous dispersion of the silylated one-shot polyurethane polymer, silylated prepolymer or prepolymer to be silylated by chain extension, when the addition of the pH modifier is required, its addition occurs in sufficient time to limit the period of time in which the silyl groups are in contact with the water of the dispersion. This minimizes the opportunity of the silyl groups, which are converted to silanol groups when in contact with water to react to form silanol dimers and siloxane oligomers.

The addition of the pH modifier can occur at various times around the step of chain extension. After the addition of the chain-extender, whether the chain extender is a conventional chain extender for polyurethane resin or whether it is difunctional isocyanate reactive organosilane, the pH modifier must be added shortly after the addition of the chain extender. The exact time of adding the pH modifier after the chain extender is added to the aqueous dispersion of the isocyanate-containing prepolymer depends upon the relative concentrations of the prepolymer and the chain extender. The pH modifier can also be added to the aqueous dispersion of the prepolymer simultaneously with the addition of any of the chain extender. Also as with the chain extender, the pH modifier can be added to the aqueous dispersing media to which the silylated polyurethane polymer or isocyanate-containing prepolymer are added for dispersion. Any time the pH modifier is added to the aqueous dispersing medium or aqueous dispersion before the chain extender reacts to any significant degree with the isocyanate-containing prepolymer or prepolymer to be silylated upon chain extension, the molecular weight build-up of the polymer is decreased. So the molecular weight of such a polyurethane polymer will be less than if the pH modifier was added to the aqueous dispersion of the isocyanate-containing prepolymer after the chain-extender reacts to increase the growth of the polyurethane polymer. It is preferred to add the pH modifier after the chain extender has had an opportunity to react with the isocyanate-containing prepolymer but before there is an opportunity for any significant build-up of silanol dimers, trimers and siloxane oligomers.

The pH modifier can be selected from any basic materials which can be added in effective amounts to bring the aqueous system to the desired pH. If the basic material is nucleophilic, the concentration of such a pH modifier should be limited so that there is no nucleophilic attack on the functional groups on the prepolymer or resulting chain-extended polymers. Nonexclusive examples of pH modifiers that can be used in the present invention include non-limiting examples of such basic materials as alkali metal hydroxides, alkaline earth metal hydroxides, salts of a strong or weak base including organic bases and weak acid. For the purpose of this invention, alkaline earth metal refers to calcium, magnesium, and barium. Also, organic bases can be used such as primary, secondary, tertiary, aliphatic and aromatic amines, pyrridine and pyrrole. The salt of a strong or weak base and weak acid refers to acid and basic salts that react basic to litmus or other indicators. Non-exclusive examples of these compounds include alkali metal borates, bicarbonates and basic bismuth nitrate and basic ferric acetate.

Non-limiting examples of the above compounds include: ammonium hydroxide, sodium, potassium or calcium hydroxide, magnesium hydroxide, barium hydroxide, sodium tetra borate decahydrate, or pentahydrate, sodium metal borate tetrahydrate, sodium tetraborate, sodium carbonate, hydrates of sodium carbonate, sodium citrate and hydrates thereof, and similar compounds of potassium, lithium and ammonium, pyrridine, pyrrole, 2-aminoethylpropanol, benzylamine, n-butylamine, t-butylamine, ethylamine, ethylenediamine, hexamethylene diamine, methylamine, 3-aminopentane, 3-amine-3-methyl pentone, piperazine, 1,3-diamino-propane and propylamine. The preferred pH modifier is ammonium hydroxide or an alkali metal hydroxide such as sodium hydroxide or a mixture of ammonium and sodium hydroxides.

The presence of an ionic hydrophilic additive in the silylated polyurethane one-shot polymer, or isocyanate-containing prepolymer can affect the pH of the dispersion. The total ionic content of the dispersion must be considered in adjusting the pH of the dispersion. For instance, both the silyl groups present as silanols as well as the anions such as ($COO^-$) present from the ionic hydrophilic additive must be considered. As an example, a polymer or prepolymer or chain extended polymer may have around 10 weight percent ionic hydrophilic additive and an amount of silyl groups of around 0.4 weight percent of the water in the dispersion. For this polymer, the pH of the dispersion should be maintained at greater than around 8.5 to produce a stable dispersion. This pH can be maintained by adding the effective amounts of components not only to form the silylated polyurethane but also to maintain the pH, or by adding an effective amount of pH modifier to obtain the pH of greater than around 8.5. As with maintaining the pH of around 7, the components that are used to produce the silylated polyurethane that are most effective in engendering the desired pH are the basic materials like the neutralizing agent and chain extenders.

The final chain extended polymer dispersed in water with a stabilizing pH should have a viscosity of about 10 to about 50,000 centipoise and preferably from about 20 to 35,000 centipoise and should have a solids content of about 20 to 80 weight percent and can be an oil-in-water type dispersion. A substantial number of the silyl groups present on the polymer exist as siliconate anions, which not only stabilize the dispersion but are capable of further reaction with hydroxyl ion-containing surfaces. The dispersion should be stable and can be essentially emulsifier free. The particle size of the dispersed phase at 1 percent solids is less than 10 preferably less than 5 and most preferably 1 micron or less, and the particles may be spherical or elongated. Generally, the dispersed, chain extended resin with siliconate anion groups is nongelled and has an intrinsic viscosity of less than 4.

The one-shot silylated polyurethane polymer with or without ethylene oxide-containing and/or cationic hydrophilic additives can have a substantial number of the silyl groups converted to siliconate anions without dispersing the polymer in water. The silyl groups would exist on the polymer with three or less ($OR_x$) groups from Formula II. By adding an effective amount of an alkali metal or alkaline earth metal hydride, a substantial number of the silyl groups can become siliconate anions. Once again, the siliconate anions in the polymer would be a mixture of silyl groups having mono and di siliconate anions with other positions on the silyl groups remaining as ($OR_x$) or silanol groups. Around 50 percent of the silyl groups would be converted to have some position having a siliconate anion.

The aqueous dispersion of the polyurethane polymer with pendant siliconate anions is employed in the aqueous treating composition for treating the glass fibers with various other components depending upon the form of the siliconate anion-containing polyurethane polymer in the dispersion. Broadly, the amount of the aqueous dispersion of the silylated polyurethane that can be used in the aqueous treating composition ranges from about 0.1 weight percent of the aqueous treating composition to any amount that will not increase the viscosity of the treating composition beyond that viscosity that enables treatment of glass fibers. More preferably, the amount of the aqueous dispersion of silylated polyurethane ranges from about 0.1 up to around 25 weight percent and most preferably up to about 15 weight percent of the aqueous treating composition.

Where the silylated polyurethane polymer is dispersed with external dispersants, the amount of the external dispersants can be increased from being an effective dispersing amount to also be an effective lubricating amount for the glass fibers. Such an amount is generally in the range of about 0.1 to about 10 weight percent of the aqueous chemical treating composition. The effective dispersing amount generally ranges from about 0.1 to about 25 weight percent of the polyurethane polymer. Preferably useful types of dispersants for the effective lubricating amount include the polyalkylene polyols such as the poly(ethylene oxide) homopolymer. With the silylated polyurethane polymer and the external emulsifier in an effective lubricating amount, the aqueous chemical treating composition can be used to treat glass fibers.

When the silylated polyurethane polymer is internally dispersed by having one or more internal hydrophilic additives, an aqueous chemical treating composition of the internally dispersible and silylated polyurethane includes the use of a lubricant in an effective lubricating amount. As with the externally dispersed polyurethane the effective lubricating amount is usually in the range of about 0.1 to about 10 and preferably about 0.1 to about 2 weight percent of the aqueous chemical treating composition. In both instances of the externally and internally dispersed polyurethane, an additional amount or an additional type of lubricant can be included. If more than one type of lubricant is employed, then the total lubricant in the aqueous chemical treating composition can range from about 0.1 to about 5 weight percent of the aqueous chemical treating composition. Any type of lubricant can be included with the dispersion of the polyurethane polymer without detrimentally affecting the polyurethane dispersion. Therefore, even cationic lubricants, for instance, Cation-X alkyl imidazoline derivative and others known to those skilled in the art for incorporation into aqueous chemical treating compositions for treating glass fibers can be added to the aqueous dispersion. In addition, the lubricants which can be included to complete the aqueous chemical treating composition for treating glass fibers can be any of the lubricants known to those skilled in the art in treating glass fibers. Examples of various lubricants are given in U.S. Pat. No. 4,271,229, which is hereby incorporated by reference. A particularly suitable lubricant is the polyoxyalkylene polyol available under the trade designation "Pluracol ®V-10" polyol from BASF Wyandotte Corporation in Michigan.

The aforedescribed aqueous chemical treating compositions are complete to treat glass fibers to protect them from interfilament abrasion and to make them compatible with polymeric matrix materials the fibers are to reinforce. These aqueous chemical treating compositions are applied to the glass fibers even though the treating compositions are essentially free of any monomeric organosilane coupling agent. The resultant treated glass fibers and resultant polymeric materials reinforced with the treated glass fibers have properties similar to materials, where a separate monomeric organosilane coupling agent is used with a separate film forming polymer. Monomeric organosilane coupling agents or organosilane coupling agents having a mixture of monomeric and dimeric forms need not be used in the aqueous chemical treating composition having the silylated polyurethane dispersion, if desired for additional properties of the treated glass fibers and resultant glass fiber reinforced polymeric material, monomeric and/or dimeric forms or organosilane coupling agents known to those skilled in the art in producing chemically treated glass fibers can be added to the aqueous chemical treating composition used to produce the treated glass fibers of the present invention.

In addition, any known component of an aqueous chemical treating composition for treating glass fibers can be employed with the aqueous dispersion of the silylated polyurethane with internal hydrophilic additives and lubricant or external dispersants or hydrophilic additives used in an effective lubricating amount. Examples include wetting agents, processing aides, additional film formers, film former modifiers, plasticizers, antistats and the like. These materials can be used in their usual art recognized amounts. A nonexclusive example of these materials in their proper amount is given in U.S. Pat. No. 4,271,229 already incorporated herein by reference. Also a particularly useful film forming polymeric additive is a polyester type polymer of U.S. Pat. No. 3,459,585 hereby incorporated by reference.

In preparing the aqueous chemical treating compositions for treating the glass fibers, the aqueous dispersion of the silylated polyurethane is added to or preferably has added to it the additional components. When the aqueous chemical treating composition is the silylated polyurethane with external dispersants in an effective lubricating amount, the preparation the dispersion of the silylated polyurethane with the external emulsifiers in the effective lubricating amount constitutes preparation of the aqueous chemical treating composition. With the use of the aqueous dispersion of internally silylated and dispersible polyurethane, the dispersion can be added to the additional components or the additional components can be added to the dispersion. With the incorporation of the dispersion with additional components, the mixture is either diluted with water to a desired volume or the dispersion and the additional components are joined with water either simultaneously or sequentially where the amount of water eventually achieves a desired volume. The pH of the aqueous treating composition with additives in addition to the dispersion of silylated polyurethane should be controlled in a manner similar to the pH of the dispersion. If additional components would tend to reduce the pH to less than around 7 or 8.5 depending on the silyl concentration of the polyurethane, then a pH modifier should be added in an effective amount. The same pH modifiers used for the dispersion can be used. Generally, the total solids of the aqueous chemical treating composition is in an effective amount to give a viscosity at ambient conditions or at elevated temperatures that enable the composition to be applied to glass fibers. Generally, the total solids should not exceed that amount which will cause the viscosity of the solution to be greater than around 100 centipoise at 20° C. Aqueous treating compositions with viscosities greater than this are difficult to apply to glass fibers during their formation without causing some breakage of the fibers.

The aqueous chemical treating composition with the internally silylated polyurethane dispersion can be used to treat glass fibers of any fiberizable glass compositions known to those skilled in the art. Nonexclusive examples include "E-glass" "621-glass", "A-glass", "C-glass", "S-glass", and low or free fluorine and/or boron derivatives thereof. The method of applying the aqueous chemical treating composition to the glass fibers can be any method known to those skilled in the art. Generally, the aqueous chemical treating composition is applied to the fibers during the formation of the fibers before they are gathered into a bundle of fibers. Myriad examples of such an application process are illustrated in U.S. Pat. No. 4,271,229, which has already been incorporated herein by reference.

The aqueous chemical treating composition is applied to the fibers to obtain a solids application of generally about 0.1 to about 3 percent by weight. Although greater amounts of solids application could be used, additional benefits may not result to justify the additional cost. This is based on the total weight of the fibers with chemical treatment. An advantage of the chemically treated glass fibers of the present invention is that glass fibers with lower solids applications result in reinforced polymers with comparable physical properties to polymers reinforced with higher solids applications of treating compositions having a mechanical mixture of monomeric organosilanes and other components.

A nonexclusive example of forming the chemically treated glass fibers is to apply the aqueous treating composition as a size during the conventional forming process to produce sized continuous glass fiber strands or wet chopped glass fiber strands. In producing continuous glass fiber strands, the sizing composition is applied to the fibers prior to the time they are gathered together to form one or more strands by means of any applicator known in the art to contact a liquid with a solid object such as, a roller applicator which is partially submerged in the sizing composition contained in a reservoir such as the applicator shown in U.S. Pat. No. 2,728,972, which is hereby incorporated by reference or a spray applicator. The fibers are gathered into strands by a gathering shoe and wound onto a forming package rotating at a sufficient speed to attenuate the fibers from the orifices in the bushing of a glass fiber batch melting furnace. Other methods of applying the sizing composition to the strands of glass fibers such as pad applicators may be employed.

A strand may be formed by means other than winding on the forming tube, such as by means of a pair of rotating wheel pullers, which direct fibers into a suitable collecting device. An example of such a process is the production of wet chopped glass fiber strands. In this process the glass fibers are drawn from cones of molten glass by attenuation and sized with the aqueous sizing composition. The attenuation is provided by a pair of rotating circumferentially juxtaposed wheels. As the glass fibers are attenuated by these two wheels, they are also cut or chopped as is more fully explained in U.S. Pat. No. 3,869,268, hereby incorporated by reference. As can be appreciated by those skilled in the art, any conventional method for producing wet chopped or dry chopped glass fiber strands or continuous glass fiber strands can utilize the aqueous sizing composition of the present invention during the forming process for producing the glass fiber strands. The wet chopped chemically treated glass fibers have portions of the surfaces of the glass fibers in the strands covered with the aqueous treating composition. The covering can approach a continuous film, although in its wet condition it is somewhat tacky. The mechanical application of the sizing composition to the glass fibers may cause the dispersion to break, but ordinarily the wet chemically treated glass fibers have a hazy surface appearance.

When the glass fiber strands are processed into continuous glass fiber strands, they are dried in conventional drying ovens at temperatures around 100° C. to 150° C. preferably 115°–130° C. for around 11 hours. Any time and temperature relationship can be employed that gives equivalent drying to remove a substantial amount of the moisture from the strands. In addition, any drying technique known to those skilled in the art may be employed to dry the glass fiber strands. For instance, dielectric, air, radio frequency or vacuum drying could be employed. When dried the chemically treated glass fiber strand usually has a clear appearance and portions of the surfaces of the glass fibers are covered with the coating as or approaching a continuous film. After this drying step, the continuous glass fiber strands can be chopped or processed into roving for reinforcement of polymers. It is preferred to use the sized glass fiber strands, where the dried continuous glass fiber strand is chopped by any method known to those skilled in the art into varying lengths, preferably around ⅛ of an inch to less than 1 inch, although shorter and/or longer lengths can also be used. Processing the treated glass fibers into these myriad forms known to those skilled in the art is accomplished with good handleability properties of the treated glass fibers. The chemically treated glass fibers can be used to reinforce sundry polymeric materials by any process known to those skilled in the art. Nonexclusive examples of polymeric materials include nylon, polyamides, polybutylene terephthalate, polyethylene terephthalate, polycarbonate, and other thermoplastic polymers and unsaturated polyester, epoxies, vinyl esters, phenolics and other thermosetting polymers.

PREFERRED EMBODIMENT OF THE INVENTION

In the preferred embodiment, the aqueous chemical treating composition has an aqueous dispersion of the internally silylated and dispersible polyurethane polymer and a lubricant. The aqueous chemical treating composition has the aqueous dispersion of the polyurethane prepared by the two step prepolymer process. In preparing the isocyanate-containing prepolymer, the organic compound with the active hydrogens for reaction with isocyanate is a polyester diol having predominantly a functionality of 2. Also the polyisocyanate is predominantly the difunctional, cycloaliphatic diisocyanate and the internal hydrophilic additive is a mixture of poly(oxyethylene) polyol homopolymer and an ionic compound which is a precursor ionic material having carboxyl groups and active hydrogens for reaction with the isocyanate functionality. The difunctional isocyanate reactive organosilane is introduced into the polymer as a comonomer rather than a chain extender and is essentially free of dimer or higher oligomeric forms.

The prepolymer reaction is an anhydrous reaction conducted in the presence of a solvent and a catalyst. The equivalent ratios of the comonomers for diisocyanate to the polyester diol are in a range of about greater than 1 to about 2 to 1 and most preferably about 1.4 to 1. The amount of difunctional organosilane is in the range of up to about 10 mole percent of the isocyanate reactive monomers. The prepolymer is prepared by combining the nonionic, nonsilane isocyanate reactive monomers. The polyester diol, commercially available under the trade designation "Tone 200", having a molecular weight of around 530 and available from Union Carbide Corporation, is combined with the hardening polyol, which is 1,4-butane diol, and with the hydrophilic ethylene oxide-containing additive which preferably has a molecular weight greater than 1,000 and less than 4,000. A suitable hydrophilic additive is available from Union Carbide Corporation under the trade designation "Carbowax 1450" material. These materials are combined with methyl ethyl ketone and added to a reaction vessel having a condenser and a drying tube and stirring blade. The mixture is heated to a temperature in the range of about 70° C. to about 90° C. for a time to complete the dissolution of the materials. The difunctional organosilane which is preferably N-(beta aminoethyl)-gamma aminopropyltrimethoxy silane available from Union Carbide Corporation under the trade designation "A-1122" silane, is added slowly in increments to the mixture of polyols in the solvent. The cycloaliphatic polyisocyanate which is preferably methylene-bis-(4 cyclohexyl isocyanate) is added slowly to the mixture in the reaction vessel. This mixture is heated to a temperature in the range of about 60° C. to 90° C. for a time sufficient to assure nearly complete reaction between the organosilane and the polyisocyanate.

The ionic hydrophilic additive, which is preferably the dimethylolpropionic acid (DMPA), is added to the mixture and dissolved completely. After a solution is achieved, the catalyst preferably dibutyltin diacetate is added, and triethylamine is added and the mixture is maintained at 90° C. for about four hours with stirring. The triethylamine is the neutralizing agent to convert any of the precursor ionic groups on the DMPA to the ionic carboxylic groups. The reaction conditions are sufficient to make this conversion and to react the components to form the prepolymer.

To test the completion of the reaction, an aliquot of the prepolymer is titrated by the standard method, ASTM 309/82, to determine the isocyanate equivalent. After the isocyanate equivalent becomes consistent, usually about 1,000 to about 1,300, the prepolymer is ready for dispersing in an aqueous medium. Warm water at about 120° F. (40° C.) or higher is slowly added to the reaction vessel containing the prepolymer in about an equal amount of water for the amount of prepolymer with vigorous stirring. Immediately after the addition of water, the chain extender, preferably ethylene diamine in a solvent, preferably water, is slowly added to the dispersed prepolymer with stirring at a temperature of about 110° F. (43° C.) to 130° F. (54° C.) for a time sufficient to react most of the chain extender to form a silylated, polyurethane-polyurea polymeric material. Shortly after the addition of the chain extender, sodium hydroxide in a 28 percent solution is added in an amount to bring the pH of the aqueous dispersion to greater than about 8.5.

In an alternative embodiment, the reactants used in the preferred embodiment are added in the following order of addition. The melted Tone 200 polyester diol is combined with butane diol, Carbowax 1450 polyethylene glycol and DMPA. These materials are heated to about 100° C. until a solution is achieved. The triethylamine neutralizer is added over about 0.5 hours at about 60° C. The monomeric N-(beta aminoethyl)-gamma-aminopropyltrimethoxy silane is added quickly with stirring for around a minute. Thereafter, the diisocyanate is added. The temperature of the mixture rises to about 90° C., and the temperature is held at 90° C. for about 0.25 hours. The solvent N-methyl pyrrolidone is added and the prepolymer is cooled until the consistent isocyanate equivalent, about 1,000 to around 1,300, is achieved. This prepolymer is dispersed in water with chain extension and pH adjustment as in the aforedescribed manner of the preferred embodiment.

A procedure for accomplishing this alternative embodiment of preparing the silylated isocyanate-containing prepolymer for an aqueous sizing composition involves an anhydrous reaction conducted in the presence of a solvent and a catalyst. A slight nitrogen blanket is maintained during the reaction. To a clean and dry kettle reactor having an agitator there was added 47.3 kg of the polyester diol commercially available under the trade designation "Tone 200" from Union Carbide Corporation. This material has a molecular weight of around 530 and was premelted at 180° C. Also added was 2.04 kg of the hydrophilic ethylene oxide-containing material, which is a polyoxyethylene polyol homopolymer available under the trade designation "Carbowax 1450" material. This material is also available from Union Carbide Corporation and was also premelted at 180° C. Also added was 247.7 grams of 1,4-butane diol as the hardening segment polyol. The difunctional organosilane, N-(betaaminoethyl)-gammaaminopropyltrimethoxy silane available from Union Carbide Corporation under the trade designation "A-1122" was added through a clean pump in an amount of 917.8 grams. As a solvent n-methyl-pyrrolidone was added in an amount of 9.21 kg. These materials were heated to 140° F. (60° C.).

Over a period of 30 minutes, while the temperature was maintained between 140° F. (60° C.) to 150° F. (66° C.), 51.67 kg of methylene-bis-(4-cyclohexyl isocyanate) were added to the kettle reactor with agitation. This cycloaliphatic diisocyanate is available under the trade designation Desmodur W material from Mobay Chemical Company. An additional amount of 7.03 kg of n-methyl-pyrrolidone was added to rinse the pumps and lines to the kettle. This mixture was held at 140° F. (60° C.) to 150° F. (66° C.) for 10 minutes.

An amount of 5.35 kg of methylolpropionic acid was added and the temperature was maintained between 170° F. (77° C.) and 175° F. (79° C.) for 30 minutes.

The acid value was determined using acetone and phenol red indicator to be between 17.7 and 18.5.

Fifty grams of the catalyst dibutyl tin dilaurate were added. The temperature was held at 170° F.–175° F. until a constant NCO equivalent of around 1045 to 1087 was obtained.

An amount of 3.04 kg of n-methyl pyrrolidone was added while cooling to 160°–165° F. Over 10 minutes, 4.04 kg of triethylamine were added to neutralize the mixture. To rinse the pump and lines, an amount of 0.45 kg of n-methyl pyrrolidone was added.

To another tank, connected through pipes with appropriate valves to the kettle reactor, an amount of 172.8 kg of water were added and the temperature was maintained at 130° F. (54° C.). Based on the constant isocyanate (NCO) equivalent, an amount of 3.49 kg ethylenediamine was mixed with 6.44 kg of water in a mix vessel.

The kettle reactor containing the prepolymer was pressurized to a pressure sufficient to transfer the prepolymer to the water in the other tank. The rate of addition is that which is necessary to avoid promoting undesirable side reactions such as the reaction between water and isocyanate which would decrease the linearity of the final polymer. The temperature in the other tank during the addition of the prepolymer is maintained between 120° F.–140° F. (49° C. to 60° C.). The ethylene diamine and water mixture is added to the resin and water mixture in the other tank to cause chain extension of the prepolymer at a rate to avoid promoting the undesirable side reactions. The temperature during the addition is maintained at about 120° F. to 140° F. (40° C. to 60° C.). All of the addition to the other tank are accomplished with agitation. Water in an amount of 23.95 kg was added to the other tanks as a rinse for the conduit lines which conveyed the materials to the other tank. The amounts and types of neutralizer and chain extender used in the production of the aqueous dispersion of the chain-extended polymer gave the dispersion a pH of 9.6. Hence, the use of a pH modifier was not required. The solids of the dispersion was 32.3, and the dispersion had a particle size of 0.66μ. The viscosity of the dispersion was 29,000 centipoise.

The dispersion of the internally silylated and dispersible and hardened ungelled polyurethane of either embodiment is preferably further diluted to have a solids content in the range of about 0.1 up to about 10 weight percent. To this dispersion there is added a lubricant in an amount of about 0.1 to about 5 weight percent of the aqueous treating composition. The lubricant used is one such as a polyoxyalkylene polyol available under the trade designation Pluracol ®V-10 polyol. This aqueous chemical treating composition is preferably used to treat "621" type glass fibers during their formation, where the fibers can have any filamentary diameter, such as from around 5 to around 30 microns and, where the fibers are to be gathered into strands of any construction. Using this silylated polyurethane dispersion with the lubricant produces treated glass fibers in the form of strands that have good choppability and handleability and which result in reinforced polymers with good strength properties. The treated glass fibers have the requisite degree of hardness from the polyurethane having internal hardening segments from lower molecular weight organic compounds with at least two active hydrogens. This degree of hardness permits the treated glass fibers to be chopped in a facile manner by either a wet or dry chop process.

The following examples are presented to further illustrate the invention described herein and are not to be construed as limiting the scope of the invention.

EXAMPLE 1A

This example shows a method of producing the silylated polyurethane in a two-step prepolymer process, where pH control is maintained by the components added to prepare the silylated polymer. Particularly, the basic neutralizing agent and organic basic chain extender in their particular amounts in relation to the amounts of other components obviated the need for addition of a pH modifier.

In a round-bottomed flask (equipped with an air-driven motor stirrer, nitrogen atmosphere, and a heating mantle) was placed 344.07 g (0.65 moles) of Tone 0200; 1.450 g (.01 mole) of Carbowax 1450; 1.80 g (.02 mole) 1,4 Butanediol; 6.67 g (0.03 mole) of A-1122; and 66.74 g N-methylpyrrolidone, which was heated at 60° C. until completely dissolved. To this mixture was added 375.20 g (1.43 moles ) Desmodur W in 76.7 g of N-methylpyrrolidone over a 30-minute period while maintaining temperature between 60° C. to 65° C. A solid portion of 38.89 g (0.29 mole) of Dimethylolpropionic acid was added to this mixture and kept between 75° C. to 80° C. After 30 minutes, the acid value should be 17.7 to 18.5. Follow reaction by an isocyanate (NCO) titration every 30 minutes. The theoretical NCO equivalent weight is 1045 to 1087 and usually takes 4 to 5 hours to be obtained. The titration procedure is based on the standard dibutyl amine method. After the reaction is complete, 29.34 g (0.29 mole) of triethylamine is added over a 10-minute period. As soon as a homogeneous solution is reached, the resin is rapidly added to 1428 g of $H_2O$. As soon as the addition is complete (an emulsion of the prepolymer should be formed), the ethylenediamine is added at a rate to prevent gelation. The amount is based on the final NCO titration. For a 1080 NCO, 21.67 g of ethylenediamine would be used. This chain-extended polyurethane emulsion had the following physical properties:

Solids 32% to 33%
pH: 10
Particle Size: 0.5 to 0.7 μ
Viscosity: 20,000 to 30,000 cps
Mn: 20,000 to 30,000

Examples 1 and 2 and the Illustrative Example of Table 1 present data of the aqueous treating compositions of the present invention. In Examples 1 and 2 the aqueous treating composition has the internally silylated and dispersible polyurethane dispersion, where the polyurethane was produced in a one-shot polymer preparation procedure.

In this procedure, the polyester diol, 1,4-butane diol, ethylene glycol, poly(oxyethylene)polyol, and N-(beta-amino-ethyl) gamma aminopropyltrimethoxy silane were combined in a 12 liter flask with high shear mixing blades. The diisocyanate was added dropwise at 70–90° C. The triethyleneamine was added as a neutralizer and the combination was brought to 130° C. and held for four hours. Hot water along with 25 percent Dowanol PM were added to emulsify the resulting polymer. A modification of this procedure is to include DMPA with subsequent neutralization by a neutralizing agent.

In a main mix tank the aqueous dispersion of the silylated, dispersible polyurethane prepared in accordance with the one-shot process and having a percent solids of 62 percent and a silyl concentration of about 0.35 weight percent of the polymer and a pH of 10 was diluted with water. The amount of water was about 42 weight percent of the aqueous treating composition. The Pluracol ®V-10 polyol was dissolved in hot water (140–160° F.) (60–71° C.) in a premix tank. Cold water in an amount of about one percent of the total weight of the formulation was added to the polyol and the mixture was stirred for 5 minutes. The mixture was placed in a main mix tank. The polyester type polymer material of U.S. Pat. No. 3,459,585 was diluted with water in a premix tank, stirred for 5 minutes and added to the main mix tank. The mixture was diluted to the desired final volume with slow agitation. If the pH of the size would be less than 9, the pH would be adjusted with 28 percent ammonium hydroxide. For Example 2, the monomeric organosilanes were added as described in U.S. Pat. No. 4,271,229.

The Illustrative Example does not have an internally silylated polyurethane, but it has a commercially available polyurethane latex. The commercially available polyurethane latex is publicized as having the following properties:
Solids (%): 62
pH: 10
Tensile (psi) at break: 5,000
Elongation at break (%): 550
Brookfield viscosity, 23° C.
20 rpm/RVF #4 spindle: 4,000 cps
Film forming temperature—250-325° F. until fused
Surfactant type: anionic-nonionic Except for the substitution of the commercially available polyurethane latex for the 2010L in the formulation of the Illustrative Example, the Illustrative Example is similar to formulation 5 of Table 1 of U.S. Pat. No. 4,271,229, and was prepared as described therein. Example 1 shows the use of internally silylated and dispersible polyurethane without the addition of any extra monomeric organosilane coupling agents. Example 2 shows the use of the internally silylated and dispersible polyurethane and similar components as in the Illustrative Example including the three separate monomeric type organosilane coupling agents. The total silane content of the treating composition of Example 1 is 0.8 weight percent and the total concentration of silanes in Example 2 is 5.14 weight percent and the total concentration of silanes in the Illustrative Example is 4.34 weight percent. All of the components listed in Table 1 are commercially available including the polyester film former made in accordance with U.S. Pat. No. 3,459,585 by Astro Industries.

temperature of around 132° C. to remove a substantial portion of the moisture from the treated glass fiber strand. The treated glass fiber strands had the residue of the aqueous chemical treating composition present in an amount of about 0.7 to 0.9 and 1.25 for Example 1 and Example 2 and 1.3 for the Illustrative Example.

Tables 2 and 3 present results of the handling properties of the treated glass fibers and molded mechanical properties of polyamide polymer reinforced with the chopped treated glass fibers respectively. Most of the test procedures for obtaining the data in Tables 2 and 3 are standard test procedures known to those skilled in the art.

The PD 104 filamentation test involves blending chopped glass fiber strand with abrasive materials and shaking the blend in a conventional paint shaker for different periods of time. Samples of the abraded, chopped strands are removed at the different time intervals and the fuzz is separated from the strands and reported as a percentage of the weight of the chopped strands.

The funnel flow test is conducted by placing a given quantity of the chopped glass fiber strands, either dry chopped or wet chopped glass fibers that are dried, in a funnel equipped for vibration. The time it took the total weight of the chopped glass fiber strand sample to pass through the funnel was recorded.

The bulk density test measures the slip/flow characteristics of the glass fibers in relation to compaction of the chopped glass fiber strand. Compaction comes into play in molding reinforced polymeric materials. Bulk density is measured by filling a test tube with a known volume of chopped glass fiber strands. The test tube is placed on a shaker and the volume occupied by the strands after shaking is recorded. High values indicate better bulk density.

The tensile strength, flexural strength and izod impact tests were conducted in accordance with the standard test methods of the American Society of Testing and Materials (ASTM). In addition, the Izod impact test was varied by reverse notching and by not notching

TABLE 1

| COMPONENTS OF TREATING COMPOSITION | Example 1 gm wt %/Solids/wt % Total | Example 2 gm wt %/Solids/wt % Total | Illustrative Example gm wt %/Solids/wt % Total |
|---|---|---|---|
| Internally silylated and dispersible polyurethane resin aqueous emulsion | 14,998/94/4.9 | 18,500/79/6.1 | —/—/— |
| Commercially available polyurethane polymer dispersion 2011L Rucothane ® polymer | —/—/— | —/—/— | 18,500/79/6.1 |
| Polyoxyalkylene polyol Pluracol ® V-10 polyol | 22/0.2/0.01 | 50/0.34/0.03 | 50/0.34/.03 |
| Polyester film former of U.S. Pat. No. 3,459,585 | 2610/5.8/0.3 | 5,000/7.6/.6 | 5,000/7.6/.6 |
| Dibutylphthalate | —/—/— | 1,000/6.9/.5 | 1,000/6.9/.5 |
| Ureido functional silane A-1160 silane | —/—/— | 1,320/9.1/.2 | 1,320/9.1/.2 |
| Aminofunctional silane A-1100 silane | —/—/— | 660/2.8/.2 | 660/2.8/.2 |
| Lubricant modified silane A-1108 silane | —/—/— | 20/0.04/.01 | 20/.1/.01 |
| Total silane concentration | —/0.8/— | —/5.14/— | —/4.34/— |
| Water | 38494.4/—/— | —/—/— | —/—/— |
| Total | 189,270 | 189,270 | 189,270 |
| Properties of Sizing Composition | | | |
| pH | 10 ± .5 | —/—/— | 10 |
| Solids (percent) | 8.5 | —/—/— | 7.8 |

Glass fibers of the G filament diameter were treated with the aqueous treating compositions of Example 1, Example 2 and the Illustrative Example and produced into G-34 strands which were subsequently chopped into ⅛" segments. The glass fiber strands were dried at a different samples to obtain additional impact strength values. These tests included respectively, D-638, D-790 and D-256.

The color test procedures noted in Table 3 were conducted in the following manner. Samples of molded reinforced polymer are exposed for UV stability in a weatherometer having a twin carbon arc to generate UV light. If the samples show discoloration after the exposure, they are judged unstable. The UV exposed samples both stable and unstable are tested for white and yellow index versus unexposed samples in a Hunter Lab colorimeter. For the white index, higher numbers are better, while for the yellow index, lower numbers are better. This test involves placing test samples into a calibrated colorimeter where the reflectance from a light source is compared to that in the x-y plane and one value in the z-plane. The coordinates reported give one value in the x-y plane and one value in the z-plane.

TABLE 2

HANDLING PROPERTIES OF ⅛" CHOPPED TREATED GLASS FIBER STRANDS OF G-34 CONSTRUCTION

| GLASS FIBER SAMPLE | % BINDER LOI | % MOISTURE | PD 104 FIL. 3 MIN. %/ 6 MIN. % | FUNNEL FLOW (SEC/20#) | BULK DENSITY (#/FT. 3) |
|---|---|---|---|---|---|
| Example 1 | 0.897 | 0.077 | 0.463/1.236 | 21.42 | 41.7 |
| Example 2 | 0.903 | 0.077 | 1.23/3.23 | 32.92 | 40.3 |
| Illustrative Example | 1.257 | 0.060 | 1.40/3.50 | 43.83 | 39.7 |
| Standard Values | 1.25 ±0.15% | 0.1% Max. | 5.7%/7.0% Max. | 23.0 for 1 kg Sample | 33 lbs/ Ft. 3 Min. |

TABLE 3

MOLDED MECHANICAL PROPERTIES OF NYLON REINFORCED WITH TREATED GLASS FIBERS

| GLASS FIBER SAMPLE | % BINDER LOI | % C.S. | TENS. STR $10^{-3}$ PSI | FLEX. STR $10^{-3}$ PSI | FLEX MODULUS $10^{-6}$ PSI |
|---|---|---|---|---|---|
| Example 1 | 1.25 | 32.1 | 28.8 | 45.9 | 1.47 |
|  | 0.72 | 34.2 | 26.9 | 42.3 | 1.37 |
| Example 2 | 1.25 | 32.2 | 28.6 | 45.6 | 1.44 |
|  | — | — | 28.5 | — | 2.91 |
| Illustrative Ex. | — | — | 27.6 | — | — |
|  | — | — | 28.5 | — | — |
|  | 1.25 | 32.4 | 25.4 | 42.1 | 1.43 |
|  | 1.15 | 32.7 | 25.4 | 42.3 | 1.33 |

| GLASS FIBER SAMPLE | IMP. IZOD | STR. FP/I REV. NOTCH | UNNOTCHED | INDEXES WHITE/YELLOW | | UV STABILITY (12 DAYS) |
|---|---|---|---|---|---|---|
| Example 1 | 3.22 | 15.6 | — | 25.7 | 4.60 | — |
|  | 2.78 | 11.5 | — | 30.5 | 6.02 | — |
| Example 2 | 3.00 | 14.7 | — | 36.8 | 3.81 | — |
|  | 2.91 | — | 23.7 | — | — | STABLE |
| Illustrative Ex. | 2.69 | — | 21.1 | — | — | STABLE |
|  | 2.62 | — | 24.0 | — | — | STABLE |
|  | 2.42 | 12.0 | — | 25.2 | 6.11 | — |
|  | 2.92 | 10.5 | — | 28.5 | 6.23 | — |

As indicated in Table 2 and 3, the treated glass fiber strands of Example 1 with the much lower concentration of silane and of Example 2 had at least equivalent performance to the material of the Illustrative Example. This equivalent performance was achieved even though the glass fiber strands of Examples 1 and 2 had a lower amount of the chemical treatment present on the fibers. Also Example 1 had at least equivalent performance and in several instances, it had better performance than the material of the Illustrative Example even though the glass fibers of Example 1 had a much lower concentration of silane than that of the Illustrative Example. Such results indicate a more efficient use of the silane in the chemically treated glass fibers of the present invention.

I claim:

1. Glass fibers treated with an aqueous chemical composition, comprising:
   a. an aqueous dispersion of a polyurethane resin having pendant silyl groups, where at least one siliconate anion is present for a majority of the silyl groups, and one or more external dispersing agents present in an effective dispersing and lubricating amount, wherein the pH of the aqueous dispersion is greater than around 7 when the silyl concentration of the polymer is greater than around 0.1 weight percent of the water in the dispersion, and
   b. water to give a total solids for the aqueous chemical treating composition so that glass fibers can be treated with the aqueous chemical treating composition.

2. Glass fibers of claim 2, wherein the one or more external dispersing agents are one or more ethylene oxide-containing emulsifiers, wherein the amount of ethylene oxide is at least the predominant amount of alkylene oxides in the emulsifier.

3. Glass fibers of claim 1, wherein the one or more external dispersing agents are present in an effective dispersing amount and the aqueous chemical treating composition has a glass fiber lubricant present in an effective lubricating amount.

4. Glass fibers of claim 1, wherein the amount of the aqueous dispersion of silylated polyurethane polymer present in the aqueous chemical treatment is in the range of up to about 0.1 to 25 weight percent of the aqueous treating composition.

5. Glass fibers of claim 1, having a dried residue of the aqueous chemical treatment in the range of about at least around 0.1 weight percent of the treated glass fiber.

6. Glass fibers of claim 1, wherein a pH modifier is present in an effective amount to result in a pH of at least around 7 when the silyl concentration is around 0.1 weight percent.

7. Glass fibers of claim 6, wherein the pH modifier is present in an effective amount to result in a pH of around at least 8.5 when the silyl concentration is greater than around 0.4 weight percent of the water in the dispersion.

8. Glass fibers of claim 1, wherein the aqueous dispersion of the silylated polyurethane polymer is formed from at least one organic polyisocyanate, at least one active hydrogen-containing material having at least two active hydrogens per molecule and at least one organosilane having at least one isocyanate-reactable group on one organic moiety of the silane having at least one alkoxy, acyloxy or hydroxy group associated with the silicon atom where these materials are reacted to produce the silylated polyurethane polymer which is combined with one or more agents in water to obtain an aqueous dispersion of the silylated polyurethane polymer.

9. Glass fibers of claim 1, wherein the aqueous dispersion of the silylated polyurethane polymer is formed from:
a. an isocyanate-containing prepolymer formed from
  1. at least one organic polyisocyanate,
  2. at least one active hydrogen-containing material having at least two active hydrogens per molecule, wherein said organic polyisocyanate and said reactive hydrogen-containing material are predominantly difunctional in the isocyanate polyaddition reaction and where the isocyanate-containing prepolymer is formed at a temperature less than 200° C. and in substantially anhydrous medium,
b. one or more dispersing agents in an effective dispersing and lubricating amount to disperse the prepolymer in an aqueous solution,
c. water in a sufficient amount to form an oil-in-water dispersion of the prepolymer,
d. at least one organosilane having a majority of at least two isocyanate reactable groups on one organic moiety of the silane and having at least one alkoxy, acyloxy or hydroxy group associated with the silicon atom to chain extend the isocyanate-containing prepolymer, where the dispersion has a pH of at least around 7 when the silyl concentration of the chain extended prepolymer is around 0.1 weight percent of the water in the dispersion.

10. Glass fibers of claim 9, wherein the aqueous chemical treating composition has present the one or more dispersing agents in an effective dispersing amount and a glass fiber lubricant present in an effective lubricating amount.

11. Glass fibers of claim 1, wherein the silylated polyurethane dispersion is formed from
a. isocyanate-containing prepolymer formed from
  1. at least one organic isocyanate,
  2. at least one active hydrogen-containing material having at least two active hydrogens per molecule,
  3. at least one organosilane having at least one isocyanate reactable group on one organic moiety of the silane and having at least one alkoxy, acyloxy or hydroxy group associated with the silicon atoms,
  wherein said organic polyisocyanate and said reactive hydrogen-containing material are predominantly difunctional in the isocyanate polyaddition reaction, and where the isocyanate-containing prepolymer is formed at a temperature less than 200° C. and in a substantially anhydrous environment,
b. one or more dispersing agents in an effective dispersing and lubricating amount to disperse the isocyanate-containing prepolymer in water,
c. water in a sufficient amount to produce an oil-in-water dispersion of the prepolymer having a pH of at least around 7 when the silyl concentration of the prepolymer is around 0.1 weight percent of the water in the dispersion to give a substantial number of siliconate anions, and
d. one or more chain-extending agents to increase the molecular weight of the silylated isocyanate-containing prepolymer.

12. Glass fibers of claim 1, wherein the silylated polyurethane has backbone hardening segments from a low molecular weight, active hydrogen-containing material having at least two active hydrogens per molecule to provide hardness to the polyurethane film forming polymer.

13. Glass fibers treated with an aqueous chemical treating composition, comprising:
a. an aqueous dispersion of a silylated polyurethane polymer formed from at least one organic polyisocyanate, at least one active hydrogen-containing material having at least two active hydrogens per molecule, at least one organosilane having at least one isocyanate reactable group on one organic moiety of the silane and having at least one alkoxy, acyloxy or hydroxy group associated with the silicon atom, internal dispersing agents selected from the group consisting of polyoxyethylene homopolymer, monofunctional polyethers, polyether polyols and active hydrogen-containing organic compounds containing ethylene oxide and having one or two active hydrogens per molecule, and ionic groups, and precursor ionic groups and mixtures of any two or more thereof, wherein the dispersion has a pH of at least around 7, when the silyl concentration of the polymer is around 0.1 weight percent of the water in the dispersion,
b. one or more lubricants in an effective lubricating amount,
c. water in an amount to give a total solids for the aqueous chemical treating composition so that the composition can be applied to glass fibers.

14. Glass fibers of claim 13, wherein the amount of the aqueous dispersion of the silylated polyurethane polymer present in the aqueous chemical treatment is in the range of about 0.1 to about 25 weight percent of the aqueous chemical treatment, where the solids content of the dispersion is at least around 5 weight percent.

15. Glass fibers of claim 13, wherein a pH modifier is present in an effective amount to result in a pH of at least around 7 when the silyl concentration is around 0.1 weight percent.

16. Glass fibers of claim 15, wherein the pH modifier is present in an effective amount to result in the dispersion having a pH of at least around 8.5, when the silyl concentration is greater than around 0.4 weight percent of the water in the dispersion.

17. Glass fibers of claim 13, wherein the organosilane has at least two isocyanate reactable groups on the organic moiety of the silane.

18. Glass fibers of claim 13, wherein the amount of the internal dispersing agent incorporated into the polymer is in the range of about 3 to about 10 weight percent of the polymer.

19. Glass fibers of claim 13, wherein the internal dispersing agent is a mixture of ethylene oxide homopolymer and an ionic material wherein the predominant amount of the internal dispersing agent is the ionic material.

20. Glass fibers of claim 19, wherein the prepolymer is formed by a combination of the comonomers so that the organosilane having at least two isocyanate reactable groups on one organic moiety of the silane reacts to near completion with the organic polyisocyanate before the addition of the ionic internal dispersing agent.

21. Glass fibers of claim 13, wherein the aqueous dispersion of the silylated polyurethane polymer is formed from:
a. an isocyanate-containing prepolymer formed from
  1. at least one organic polyisocyanate,
  2. at least one active hydrogen-containing material having at least two active hydrogens per molecule,
  3. one or more dispersing agents to disperse the resultant prepolymer in an aqueous solution, wherein said organic polyisocyanate and said reactive hydrogen-containing material are predominantly difunctional in the isocyanate polyaddition reaction and where the isocyanate-containing prepolymer is formed at a temperature less than 200° C. and in substantially anhydrous medium,
b. water in a sufficient amount to form an oil-in-water dispersion of the prepolymer,
c. at least one organosilane having a majority of at least two isocyanate reactable groups on one organic moiety of the silane and having at least one alkoxy, acyloxy or hydroxy group associated with the silicon atom to chain-extend the isocyanate-containing prepolymer, wherein the dispersion has a pH of at least around 7 when the silyl concentration on the polymer is around 0.1 weight percent of the water in the dispersion.

22. Glass fibers of claim 20, wherein the organosilane is substantially 100 percent monomeric silane.

23. Glass fibers of claim 13, wherein the silylated polyurethane dispersion is formed from
a. isocyanate-containing prepolymer formed from
  1. at least one organic polyisocyanate,
  2. at least one active hydrogen-containing material having at least two active hydrogens per molecule,
  3. at least one organosilane having at least two isocyanate reactable groups on one organic moiety of the silane and having at least one alkoxy, acyloxy or hydroxy group associated with the silicon atom,
  4. one or more dispersing agents to assist in dispersing the isocyanate-containing prepolymer in water, wherein said organic polyisocyanate and said reactive-hydrogen-containing hydrogen-containing material are predominantly difunctional in the isocyanate polyaddition reaction, and where the isocyanate-containing prepolymer is formed at a temperature less than 200° C. and in a substantially anhydrous environment,
b. water in a sufficient amount to produce an oil-in-water dispersion of the prepolymer wherein the dispersion has a pH of at least about 7 when the silyl concentration of the polymer is around 0.1 weight percent of the water in the dispersion, and
c. one or more chain-extending agents to increase the molecular weight of the silylated isocyanate-containing prepolymer.

24. Glass fibers of claim 13, wherein the silylated polyurethane has backbone hardening segments from a low molecular weight, active hydrogen-containing material having at least two active hydrogens per molecule to provide hardness to the polyurethane film forming polymer.

25. Glass fibers of claim 13, wherein the lubricant is polyoxyalkylene polyol with a molecular weight in the range of about 1000 to about 4400.

26. Glass fibers of claim 13, wherein additional components to the aqueous chemical treatment composition are selected from the group consisting of coupling agents, film formers, film forming modifiers, Plasticizers, crosslinking agents, and any mixtures of two or more of these materials.

27. Process of producing glass fiber reinforced polymeric materials with the treated glass fibers of claim 1.

28. Glass fibers of claim 13, wherein the precursor ionic hydrophilic additives are neutralized before the polymer is dispersed in water so that ionic groups are present on the polymer.

29. Glass fibers treated with an aqueous chemical treating composition, comprising:
A. isocyanate-containing prepolymer formed from:
  1. organic polyisocyanate,
  2. active hydrogen-containing material having at least two active hydrogens per molecule,
  3. hydrophilic additives selected from the group consisting of polyethers having a predominant amount of ethylene oxide moieties, polyoxyethylene polyol homopolymers, monofunctional polyethers, polyether polyols, diisocyanates having lateral hydrophilic ethylene oxide units, organic compounds which are difunctional in the isocyanate polyaddition reaction and contain lateral hydrophilic ethylene oxide units, monoisocyanates which contain terminal, hydrophilic ethylene oxide units, compounds which are monofunctional in the isocyanate polyaddition reaction and contain terminal hydrophilic ethylene oxide units, organic compounds having at least two active hydrogens per molecule having ionic or precursor ionic groups and mixtures thereof, and
  4. at least one organosilane having at least one isocyanate-reactable group on one or more organic moieties of the organosilane and having at least one hydrolyzed or hydrolyzable group associated with the silicon atom, wherein any ionic or precursor ionic hydrophilic additive is added after the organosilane and polyisocyanate have reacted to a substantial degree,
B. neutralizing agent in an effective amount to neutralize a substantial amount of precusor ionic groups of the hydrophilic agent into ionic groups,
C. water in a sufficient amount to form an oil-in-water dispersion of the isocyanate-containing prepolymer,
D. chain-extender in an amount to react with a substantial number of the isocyanate groups on the isocyanate-containing prepolymer,
E. wherein the pH of the dispersion is at least around 7, when the silyl concentration on the polymer is greater than around 0.1 weight percent of the water in the dispersion isocyanate-containing prepolymer as a substantial portion of the silyl groups in the prepolymer or the chain-extended polymer are present as siliconate anions, and wherein said organic polyisocyanate and said organic compound with at least two reactive hydrogens per molecule are predominantly difunctional in the isocyanate-polyaddition reaction, and wherein the organosilane is present as a comonomer in forming the prepolymer or as a chain extender F. one or more lubricants in an effective lubricating amount, and G. water in an amount to give a total solids for the aqueous chemical treating composition so that the composition can be applied to glass fibers.

30. Glass fibers of claim 29, wherein the lubricant is a cationic fiber lubricant.

31. Glass fibers of claim 30, wherein the cationic lubricant is a fatty acid amine salt.

32. Glass fibers of claim 29, wherein the difunctional isocyanate organosilane has the formula:

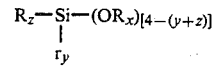

where $R_y$ and $R_z$ are organic moieties having 2 to 20 carbon atoms such as alkyls having 1 to 6 carbon atoms and aryls, alkylaryls, and and arylalkyls and y and z are integers so that y is equal to 0 or 1 and z is equal to 1 or 2, where one or both of $r_y$ and $R_z$ organic moieties having one isocyanate reactable group or where $R_z$ has one or two reactable isocyanate-reactable groups when y=0 or when the $r_y$ organic moiety has no such reactable groups and where $(OR_x)$ is the hydrolyzable or hydrolyzed groups such as alkoxy, acryloxy, hydroxy, or the like and $R_x$ is methyl, ethyl, n-propyl or hydrogen.

33. Glass fibers of claim 1, wherein the pendant silyl groups, where at least one siliconate anion is present for a majority of the silyl groups are reactable with the glass fibers, and where the amount of the silyl groups is less than the amount which would cause three-dimensional gellation through interaction of the nonsiliconate anion groups to form siloxanes.

* * * * *

UNITED STATES PATENT AND TRADEMARK OFFICE
CERTIFICATE OF CORRECTION

PATENT NO. : 4,542,065

DATED : September 17, 1985

INVENTOR(S) : Peter C. Gaa

It is certified that error appears in the above-identified patent and that said Letters Patent is hereby corrected as shown below:

Column 35, line 58, delete the second o-currence of "hydrogen-containing".

Column 36 line 16, delete "Plasticizers" and insert --plasticizers--.

Signed and Sealed this

Third Day of December 1985

[SEAL]

Attest:

Attesting Officer

DONALD J. QUIGG

Commissioner of Patents and Trademarks